(12) United States Patent
Imanishi et al.

(10) Patent No.: US 7,610,742 B2
(45) Date of Patent: Nov. 3, 2009

(54) MOWER UNIT

(75) Inventors: Ryouzou Imanishi, Kishiwada (JP);
Hiroaki Kitaguchi, Takaishi (JP);
Nobuyuki Yamashita, Izumi (JP);
Hiroki Nagai, Izumiotsu (JP); Hiroshi Oshima, Osaka (JP); Tomoyuki Morikawa, Takatsuki (JP); Takashi Fujii, Sakai (JP); Toshiki Kanai, Sakai (JP); Katsuhiko Uemura, Sakai (JP);
Hiroyuki Ogasawara, Nishinomiya (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 11/848,753

(22) Filed: Aug. 31, 2007

(65) Prior Publication Data

US 2008/0092509 A1    Apr. 24, 2008

(30) Foreign Application Priority Data

Oct. 19, 2006  (JP) .............................. 2006-285010
May 11, 2007  (JP) .............................. 2007-126946

(51) Int. Cl.
*A01D 67/00* (2006.01)
(52) U.S. Cl. ..................................... 56/320.2; 56/320.1
(58) Field of Classification Search ........................ 56/1, 56/5, 17.4, 194, 202, 320.1, 320.2, DIG. 9, 56/DIG. 20, 255, 295, 17.5

See application file for complete search history.

(56) References Cited

U.S. PATENT DOCUMENTS

| | | | | |
|---|---|---|---|---|
| 3,085,386 | A | * | 4/1963 | Slemmons .................. 56/13.4 |
| 5,913,804 | A | * | 6/1999 | Benway ..................... 56/320.2 |
| 6,178,729 | B1 | * | 1/2001 | Vastag ........................ 56/17.5 |
| 6,694,716 | B1 | * | 2/2004 | Osborne ...................... 56/202 |
| 6,874,309 | B1 | * | 4/2005 | Bellis, Jr. .................. 56/320.2 |

FOREIGN PATENT DOCUMENTS

| | | |
|---|---|---|
| JP | 2003125626 | 5/2003 |
| JP | 2005253387 | 9/2005 |

* cited by examiner

*Primary Examiner*—Alicia M Torres
(74) *Attorney, Agent, or Firm*—The Webb Law Firm

(57) ABSTRACT

A mower unit includes a mower deck, a plurality of blades mounted inside the mower deck and rotatable about vertical shafts supported to the mower deck, the mower deck defining, on one lateral side thereof, a discharge outlet for discharging cut grass cut by the plurality of blades, and an opening and closing member configured to be movable to a closing position for closing the discharge outlet and also to an opening position away from the discharge outlet for opening the discharge outlet, the opening and closing member at the opening position being disposed along an outer face of the mower deck.

12 Claims, 17 Drawing Sheets

Fig. 14
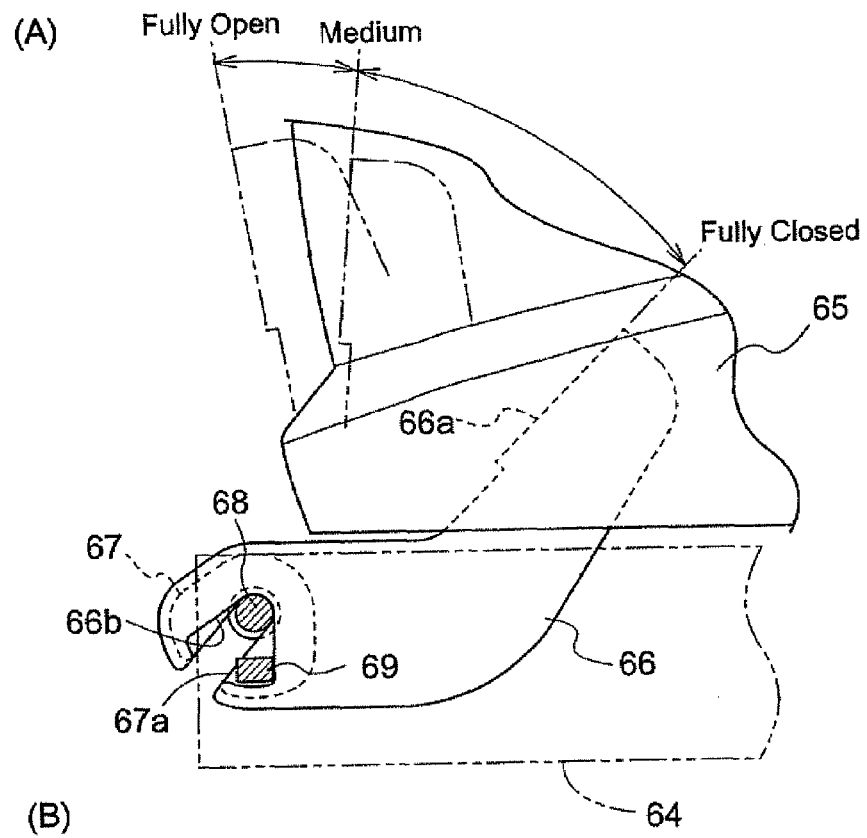
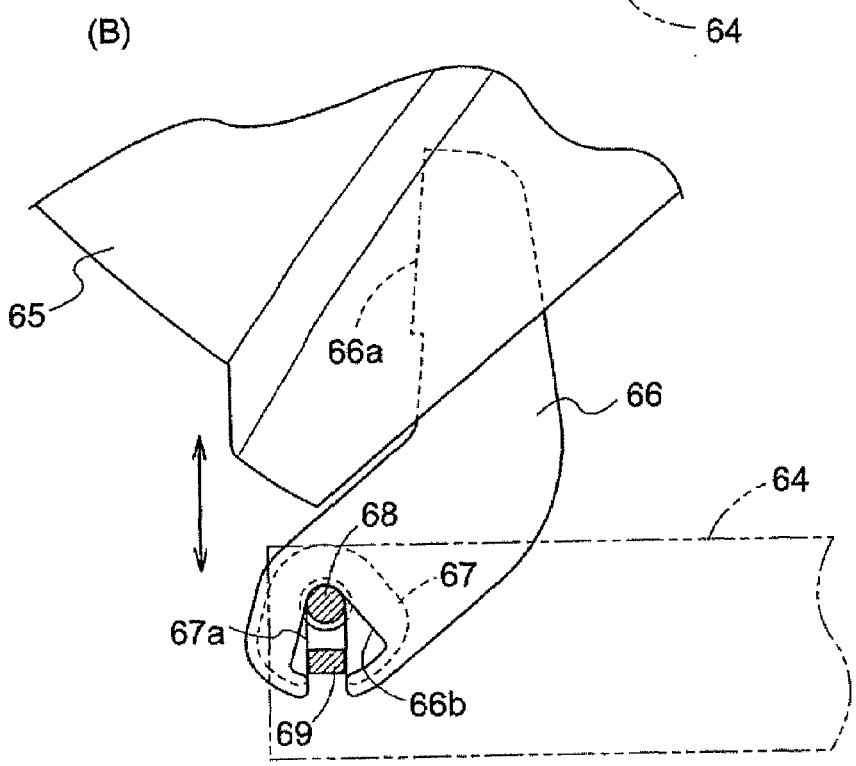

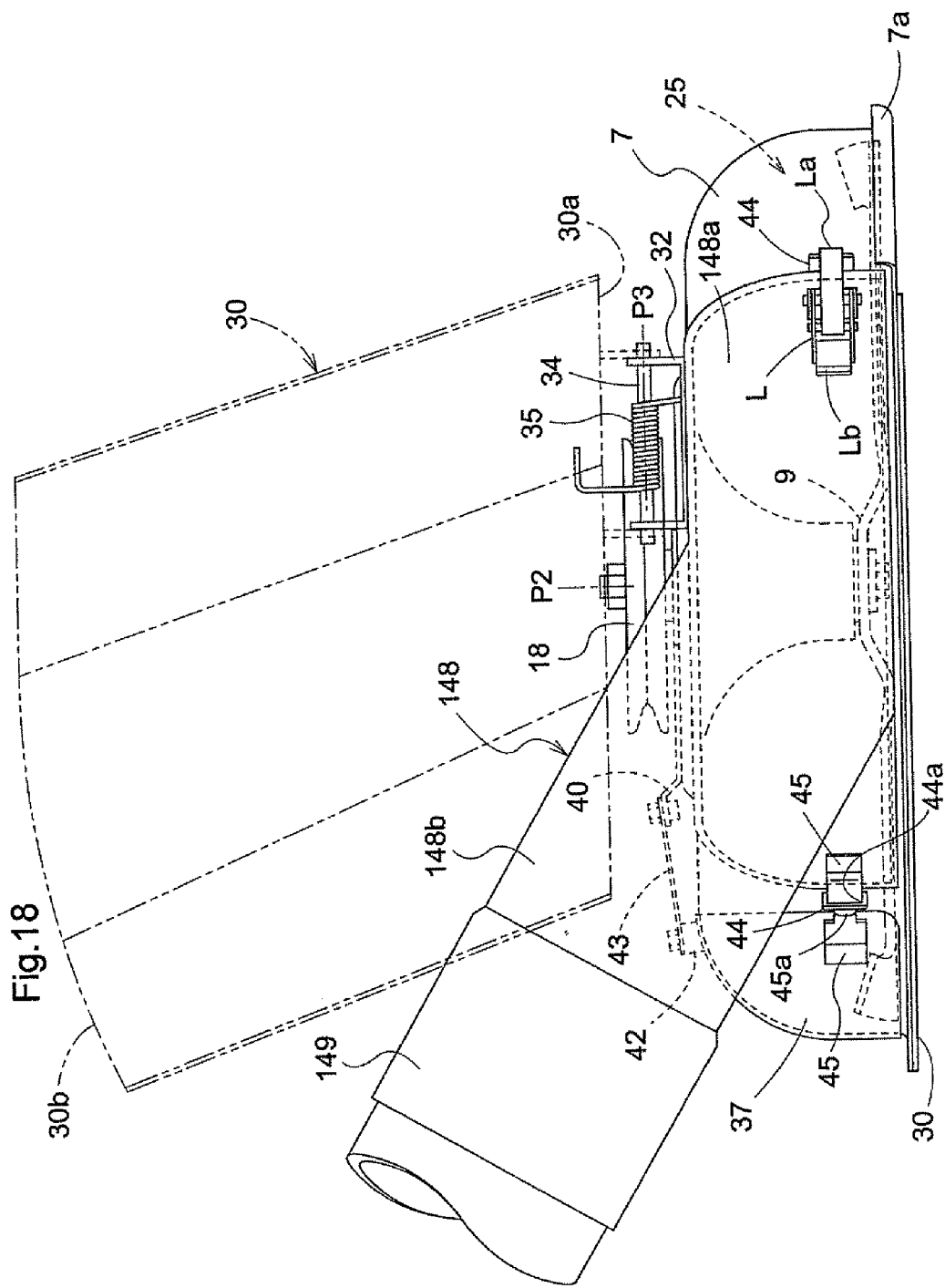

MOWER UNIT

BACKGROUND OF THE INVENTION

The present invention relates to a mower unit.

As a prior art pertinent thereto, as disclosed in JP2003-125626 for instance, there is known a mower capable, with attachment/detachment of a blowout preventing plate, of selectively providing a mulching mode in which cut grass cut by rotary blades are caused to stay within a mower deck to shredded into further smaller pieces and a side discharge mode in which the cut grass cut by the rotary blades are discharged as they are from a lateral side of the mower deck. Further, as disclosed in JP 2005-253387, there is also known a mower capable, with attachment/detachment of a shredding baffle, of selectively providing a mulching mode in which cut grass cut by rotary blades are caused to stay within a mower deck to be shredded into further smaller pieces and a side discharge mode in which the cut grass cut by the rotary blades is discharged from a lateral side of the mower deck.

With such constructions as above employed by the conventional mowers disclosed in the above-identified documents involving attachment and detachment of a blowout preventing plate or a shredding baffle, when e.g. a side-discharge mode of operation was to be effected, it was needed to store the blowout preventing plate or shredding baffle detached from the mower deck at a driver's seat of the lawn mower or in a storage vault. Therefore, if the mode of operation was to be switched over from the side-discharge mode to the mulching mode, it was necessary to carry the blowout preventing plate or shredding baffle stored at the driver's seat or the storage vault to the mower. Hence, the switchover of the operation mode could not be done speedily on the work site and the attachment and detachment of the blowout preventing plate or shredding baffle could not be done in an efficient manner. Further, if the blowout preventing plate or shredding baffle was stored in a storage vault or the like, there was also a risk of this blowout preventing plate or shredding baffle getting lost.

SUMMARY OF THE INVENTION

An object of the present invention is to realize a mower unit which facilitates the switchover of the operation mode between the mulching mode and the side-discharge mode and which also can effectively prevent loss of an opening and closing member.

For accomplishing the above object, a mower unit, according to the present invention, comprises:

a mower deck;

a plurality of blades mounted inside said mower deck and rotatable about vertical shafts supported to said mower deck, said mower deck defining, on one lateral side thereof, a discharge outlet for discharging cut grass cut by the plurality of blades; and an opening and closing member configured to be moved to a closing position for closing said discharge outlet and also to an opening position away from said discharge outlet for opening this discharge outlet, said opening and closing member at said opening position extends along an outer face of said mower deck.

With the above-described construction, as there is provided the opening/closing member configured to be movable to a closing position for closing the discharge outlet and also to an opening position away from the discharge outlet for opening this discharge outlet, by moving this opening and closing member, the discharge opening can be closed and opened, thus effecting the operation mode switchover between the mulching mode (the opening and closing member is set at the closing position) and the side-discharge mode (the opening and closing member is set at the opening position). That is, the operation mode switchover can be realized by moving the opening and closing member between the closing position and the opening position. Therefore, in the side-discharge mode, the opening and closing member can be stored as being kept attached to the mower deck, without needing to be stored at the driver's seat or in a storage vault.

Further, when at its opening position, the opening and closing member is disposed along the outer face of the mower deck. With this, the opening and closing member, at its opening position, can be disposed without significantly projecting from the outer face of the mower deck.

BRIEF DESCRIPTION OF THE DRAWINGS

FIG. 14 is a side view in vertical section for explaining the opening closing construction of the engine hood, FIG. 18 is a right side view of the mower in the cut grass collecting mode.

DETAILED DESCRIPTION OF PREFERRED EMBODIMENTS

Next, embodiments of the invention will be described with reference to the accompanying drawings. While a plurality of embodiments will be described below, it is understood that various combinations of features of one embodiment and features of another embodiment too are included in the scope of the present invention.

[General Construction of Riding Lawn Mower]

Figure 1:
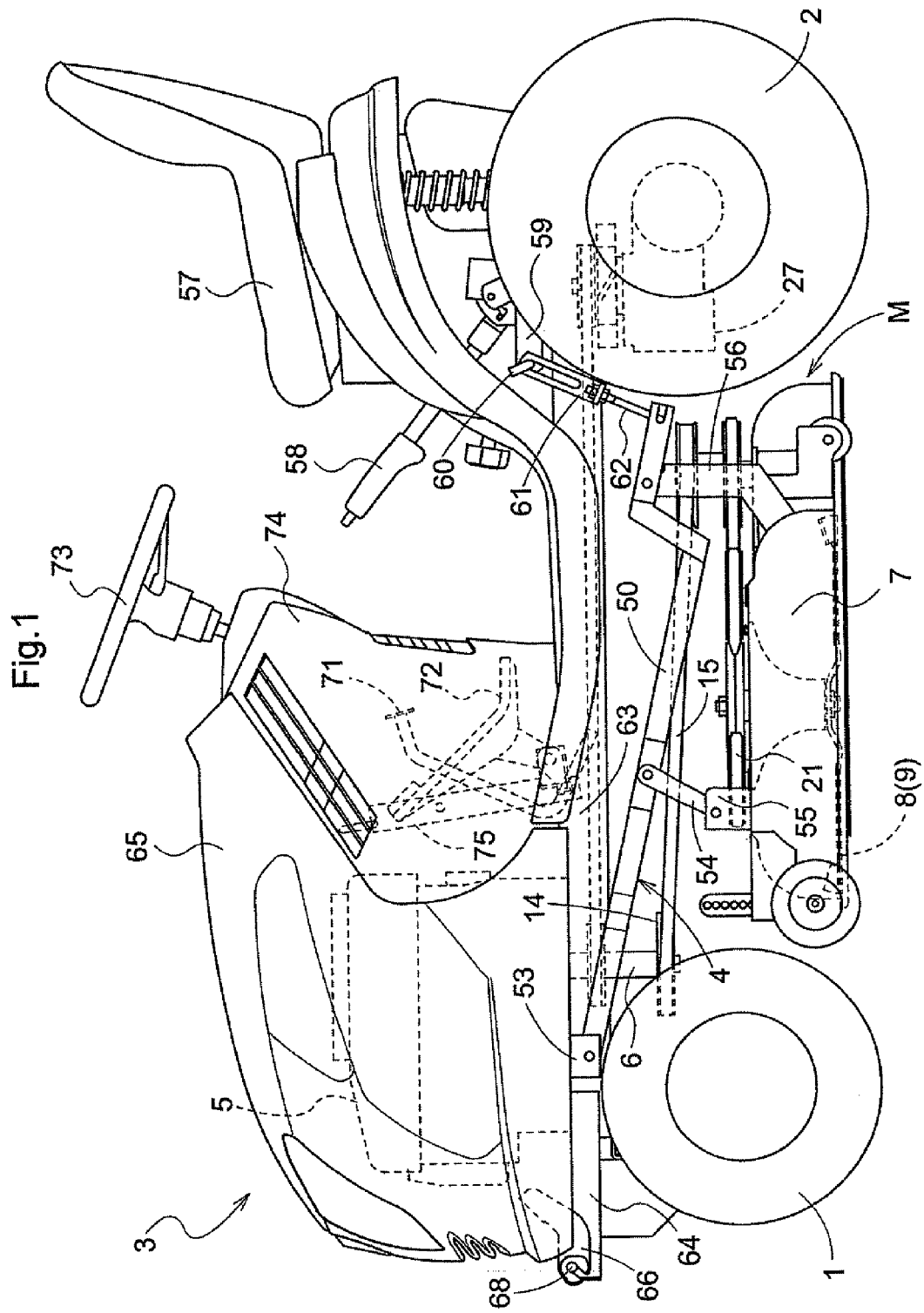
FIG. 1 is an overall left side view of a riding lawn mower.
Figure 2:
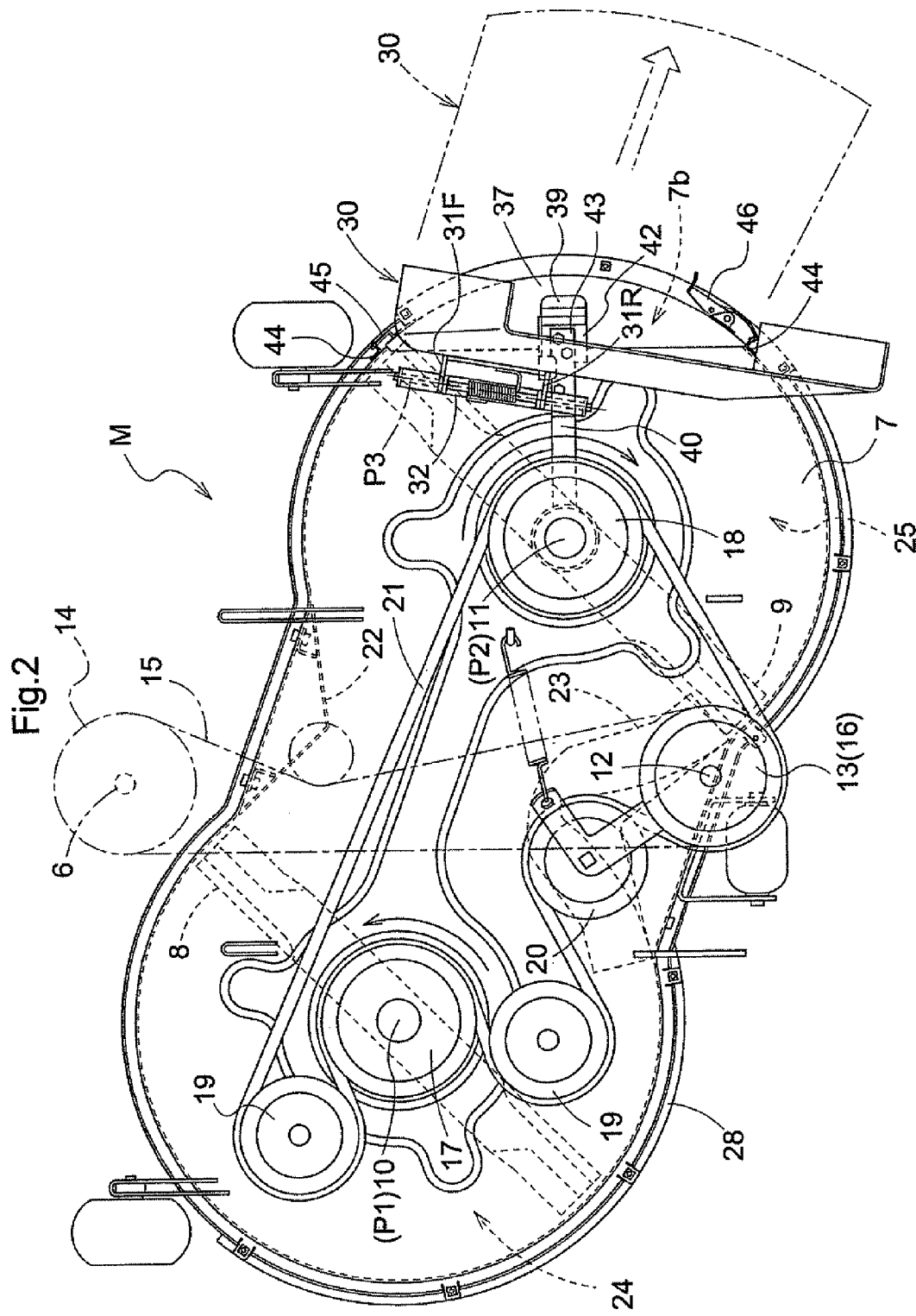
FIG. 2 is an overall plan view of the mower in a mulching mode.
Figure 3:
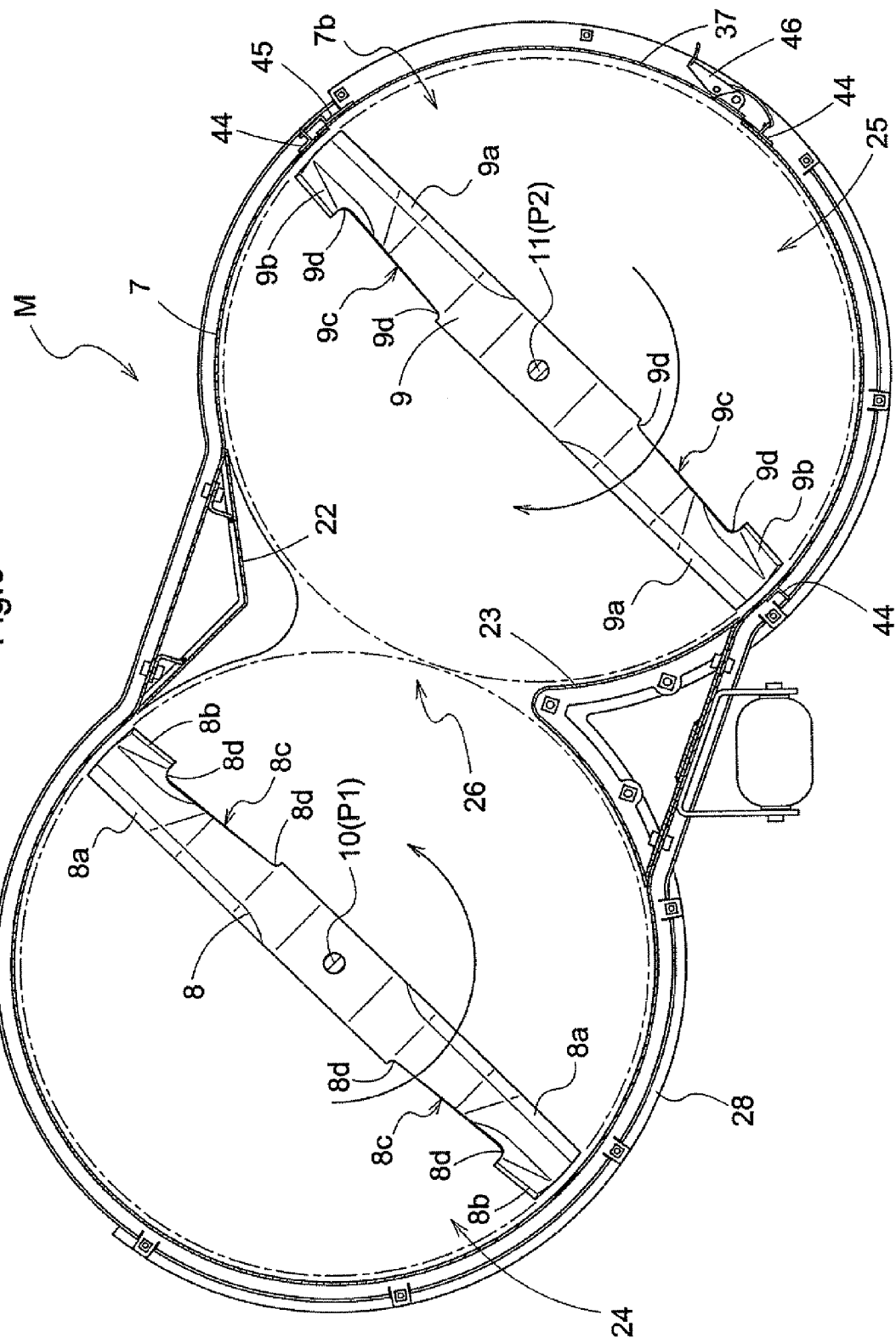
FIG. 3 is a plan view in horizontal section showing the mower in the mulching mode.

With reference to FIGS. 1 through 3, a general construction of a riding lawn mower will be described As shown in FIG. 1, in this riding lawn mower, a traveling vehicle body 3 includes steerable front wheels 1 and non-steerable, but drivable rear wheels 2. From the bottom face of this traveling vehicle body 3, there is suspended a mower unit M via a link mechanism 4 to be lifted up and down in translation. The traveling vehicle body 3 mounts, at a front portion thereof, a vertical shaft type engine 5. An output shaft 6 projects from a lower portion of this engine 5. A vertical shaft rotational power obtained from this output shaft is transmitted via a belt to a transmission case 27 mounting the rear wheels 2 and the mower unit M, respectively.

As shown in FIGS. 2 and 3, the mower unit M has a twin-blade construction including two rotary blades 8, 9 mounted on a mower deck 7, with the blades 8, 9 being juxtaposed in the right and left direction. The rotary blades 8, 9 are connected to lower ends of drive shafts 10, 11 which are mounted through the upper face of the mower deck 7 at right and left portions thereof, respectively (each of the rotary blades 8, 9 comprises a band plate like steel member having a cutter blade 8a, 9a at one of opposed ends thereof and a wind-raising blade 9b, 8b formed as a bent portion at the other end thereof.

At a position rearwardly of a right and left center of the upper face of the mower deck 7, there is provided an input shaft 12. A drive belt 15 is entrained in tension about an input pulley 13 attached to the input shaft 12 and an output pulley 14 attached to the output shaft 6 of the engine 5. Further, a single transmission belt 21 is entrained in tension about a drive pulley 16 attached to the input shaft 12, transmission pulleys 17, 18 attached to the respective drive shafts 10, 11 and guide pulleys 19,19 and a tension pulley 20 mounted to the mower deck 7, so that the two rotary blades 8, 9 are driven to rotate in opposite directions to each other. The rotational directions of the two rotary blades 8, 9 are set such that rearwardly of rotational axes P1, P2 thereof relative to the vehicle body, rotary paths of the leading ends of the two rotary blades 8, 9 are inwardly opposed to each other.

The mower unit M is disposed with a slight inclination such that the rotational axis P1 of the rotary blade 8 disposed on the left side of the vehicle body as viewed from above may be located forwardly of the rotational axis P2 of the rotary blade 9 disposed on the right side of the vehicle body, and as the rotary paths of the leading ends of the two rotary blades 8, 9 are slightly overlapped with each other in the fore and aft direction so as to restrict occurrence of cutting leftover (cutting failure) between the two rotary blades 8) 9.

At the front center portion and the rear center portion of the inside of the mower deck 7, there are mounted a front vacuum plate 22 and a rear vacuum plate 23, each of which as an angle shape in its plan view. And, along the rotary paths of the leading ends of the rotary blades 8, 9, there are formed approximately circular cutting chambers 24, 25 for the rotary blades 8, 9, respectively. The tops of the front vacuum plate 22 and the rear vacuum plate 23 are opposed to each other with a gap therebetween, and an opening 26 for allowing flowing passage of cut grass is formed between the two cutting chambers 24, 25.

The mower deck 7 has an elliptical shape in its plan view, which exhibits also a bowl-like curved shape in its cross section. The mower deck 7 is formed by pressing of a steel plate into such a shape that in a mulching mode to be described later, cut grass cut by the rotary blades 8, 9 are allowed to stay within the mower deck 7 to be shredded into even smaller pieces, the shape also ensuring sufficient strength for this mower deck 7.

An edge portion 7a at the lower end of the mower deck 7 is bent to the outer side and also to the upper side along the entire periphery thereof, except for a lower portion of a discharge outlet 7b to be described later, so that the portion is formed integrally in a U-shape cross section which is open upward, thus ensuring sufficient strength at the lower end of the mower deck 7. The lower edge 7a located downwardly of the discharge outlet 7b is formed integrally with the mower deck 7 and has an L-shaped cross section, so that this edge portion 7a is configured so as not to provide much resistance to the discharging operation of the cut grass.

To the lower side of the edge portion 7a of the mower deck 7, there is detachably fixed a band-like reinforcing plate 28 conformed with the edge portion 7a of the mower deck 7. With this, it is possible to prevent damage in the edge portion 7a of the mower deck 7 due to contact with a rock or the like when the riding lawn mower travels with the mower unit M being lowered and possible also to improve the strength of the edge portion 7a of the mower deck 7 and to allow replacement of the reinforcing plate 28 when damaged.

As shown in FIG. 3, on the opposite side away from the cutter blades 8a, 9a of the rotary blades 8, 9, there are formed cutout portions 8c, 9c. These cutout portions 8c, 9c allow reduction in the weight at the leading end portions of the rotary blades 8, 9, thus restricting rotational torques of the rotary blades 8, 9. Further, with the formation of these cutout portions 8c, 9e, the upward bending operation for forming the wind-raising blades 8b, 9b can be carried out easily and the manufacture costs of the rotary blades 8, 9 can be reduced, as well.

The cutout portions 8c,9c are shaped so as to extend progressively winder in the rotational direction toward the leading ends thereof, and at the opposed ends thereof there are formed curved portions 8d, 9d. With the above-described formation of the cutout portions 8c, 8c and the tapered shaping of the leading ends of the rotary blades 8, 9, it is possible to prevent occurrence of stress concentration in the rotary blades 8, 9. As a result, the rotational torques of the rotary blades 8, 9 are restricted and the manufacture cost of the rotary blades 8, 9 is restricted, and at the same time the damage of these rotary blades 8, 9 can be prevented.

[Detailed Construction of Pivotal Cover]

Figure 4:
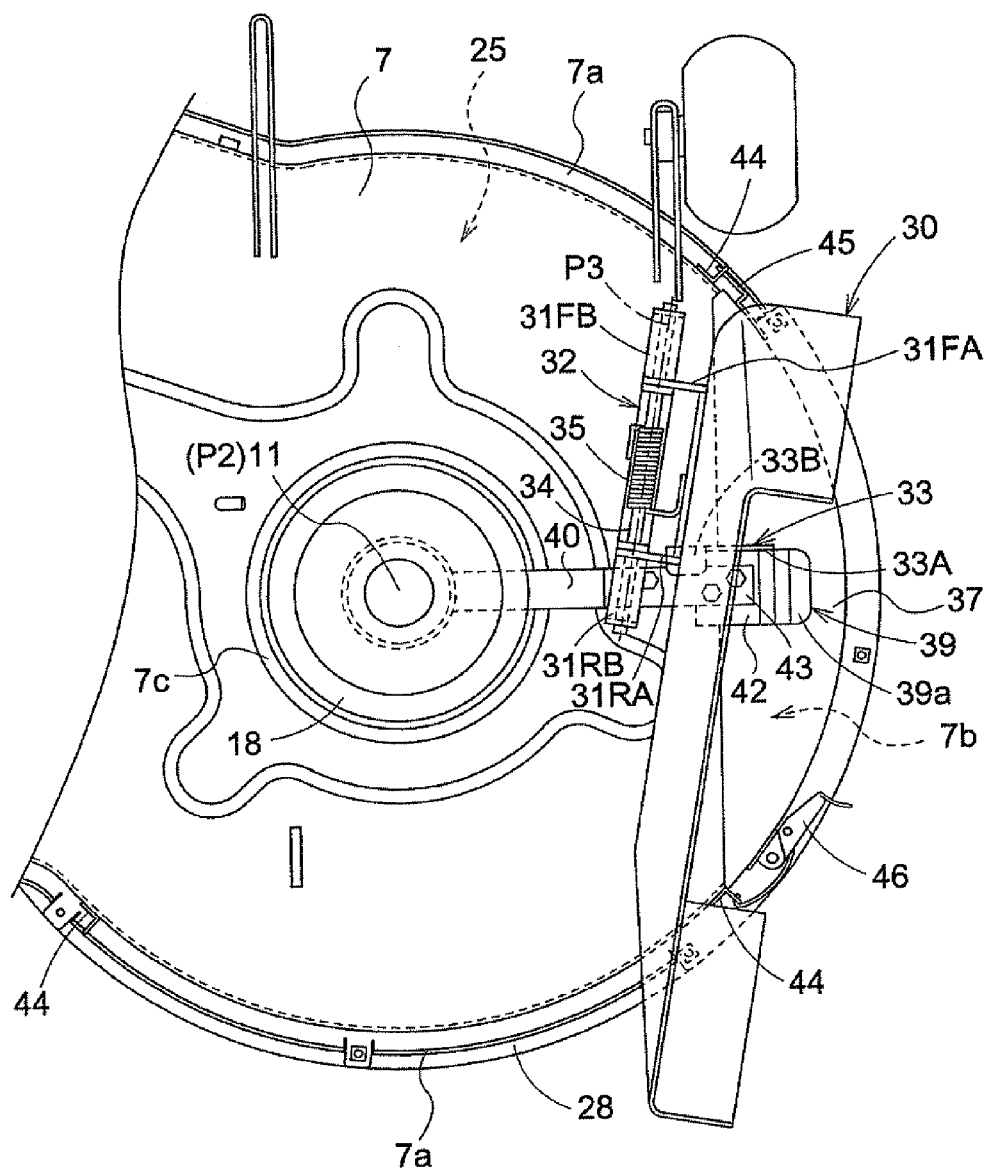
FIG. 4 is a plan view showing a right portion of the mower in the mulching mode.
Figure 5:
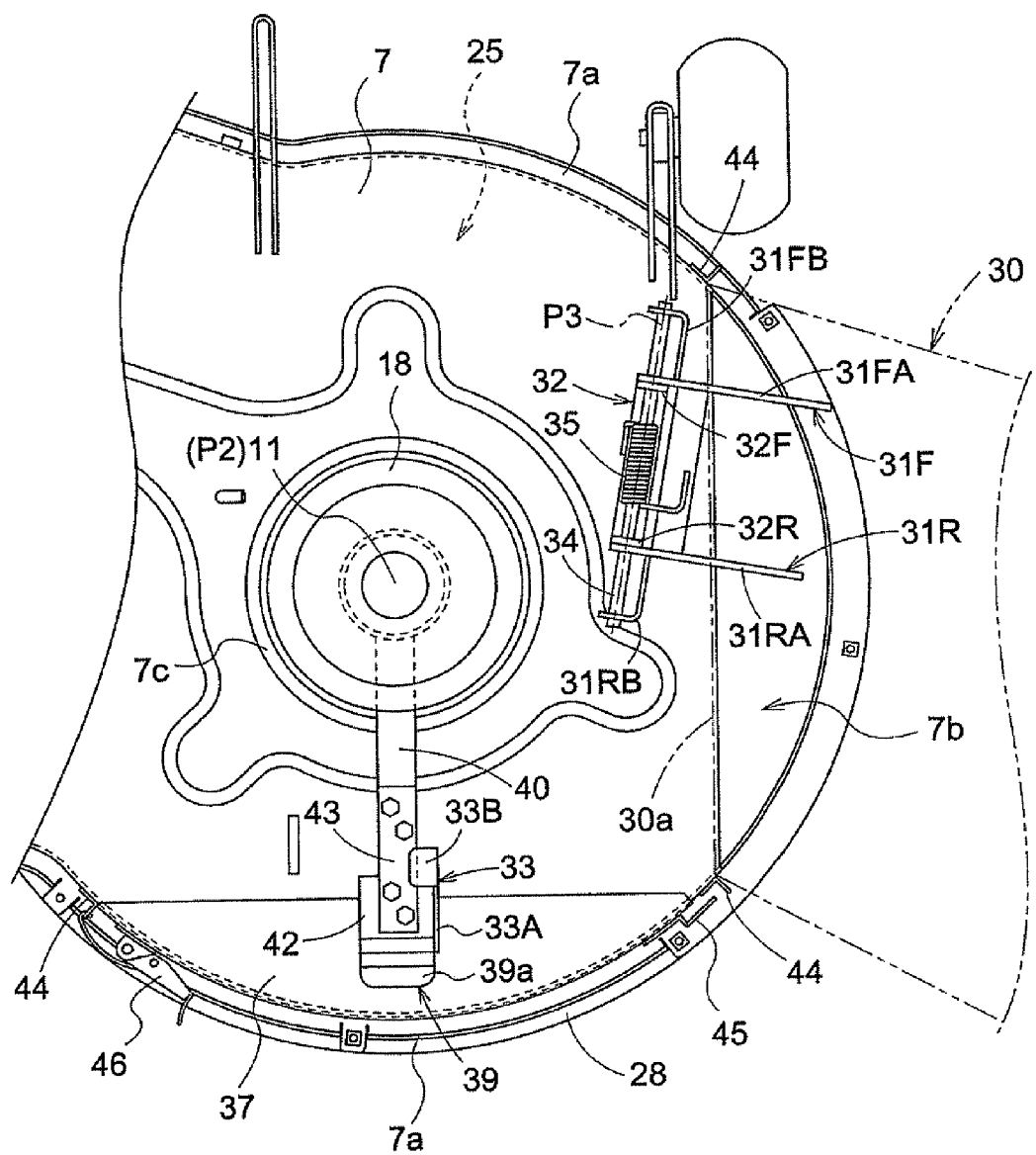
FIG. 5 is a plan view showing the right portion of the mower in a side-discharge mode.

With reference to FIGS. 4, 5 and 8-10, the detailed construction of a pivotal cover 30 (corresponding to "a guide member") will be described. As shown in FIGS. 4 and 5, on the right side portion of the mower deck 7, there is attached the pivotal cover 30 to be vertically pivotable about an axis P3 oriented along the fore and aft direction. In operation, in a side-discharge mode to be described later, when the vehicle travels with this pivotal cover 30 being pivoted downward and the rotary blades 8, 9 being rotated, grass pieces cut inside the mower deck 7 can be discharged rearward in an obliquely right direction relative to the mower deck 7.

Figure 8:
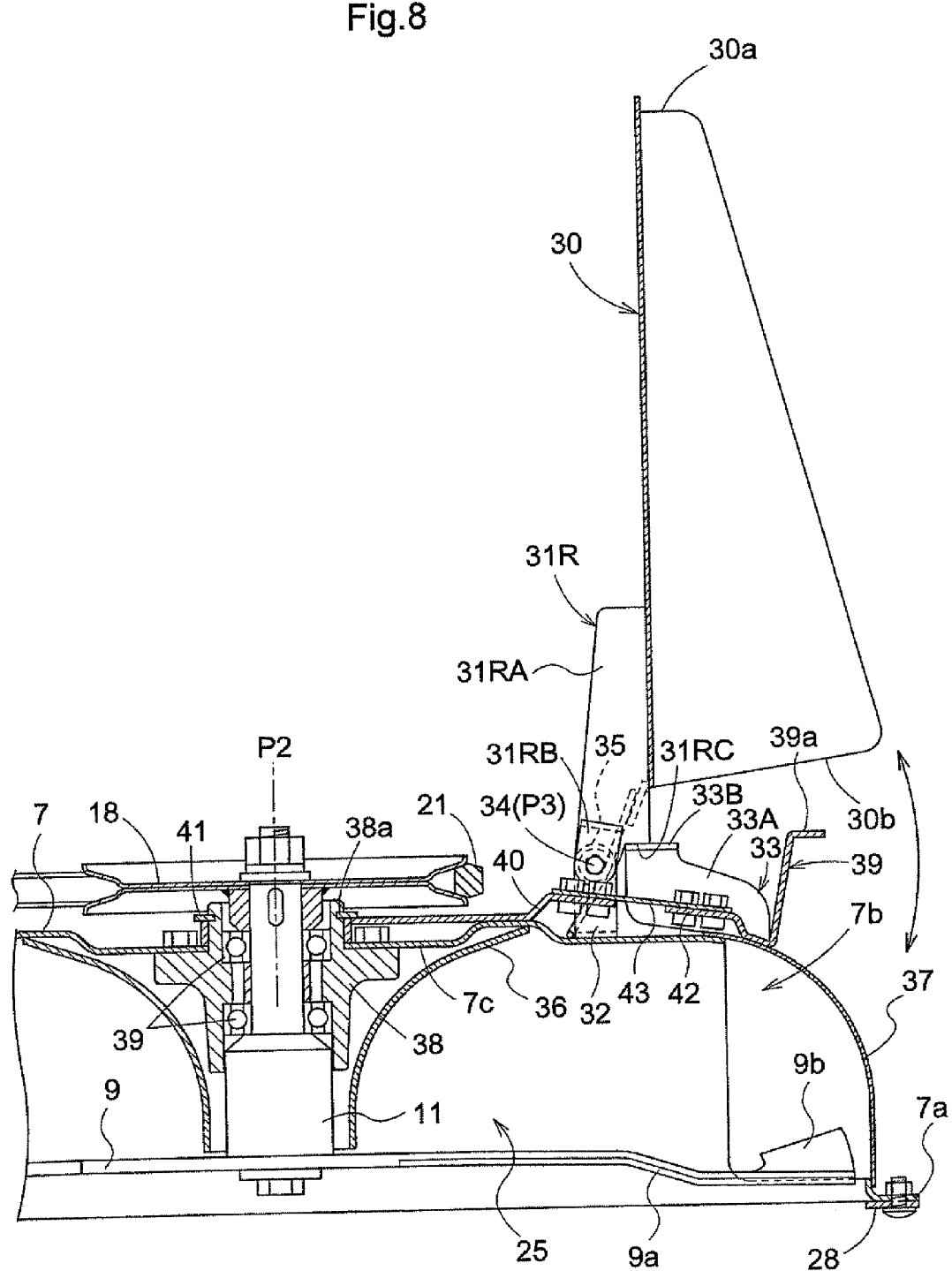
FIG. 8 is a rear view in vertical section showing the right portion of the mower in the mulching mode.
Figure 9:
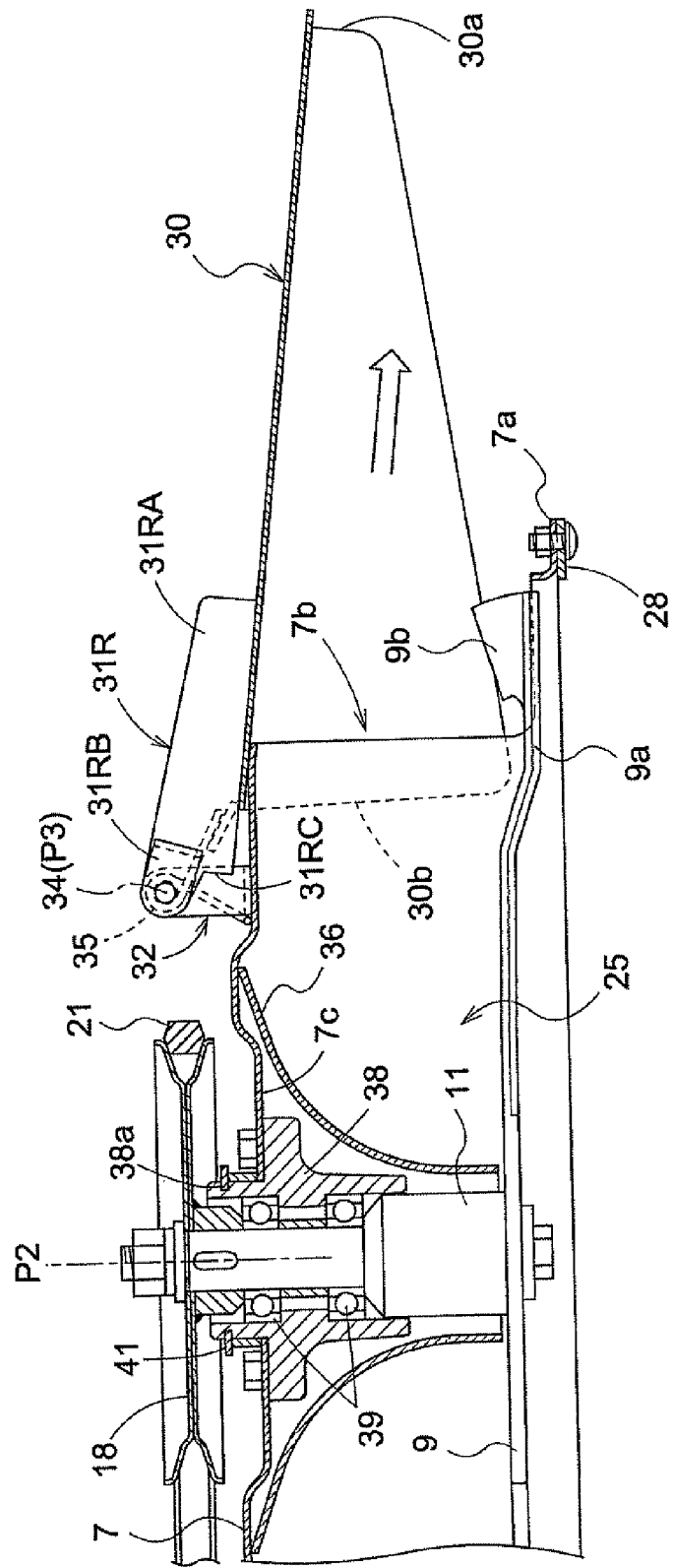
FIG. 9 is a rear view in vertical section showing the right portion of the mower in the side-discharge mode.
Figure 10:
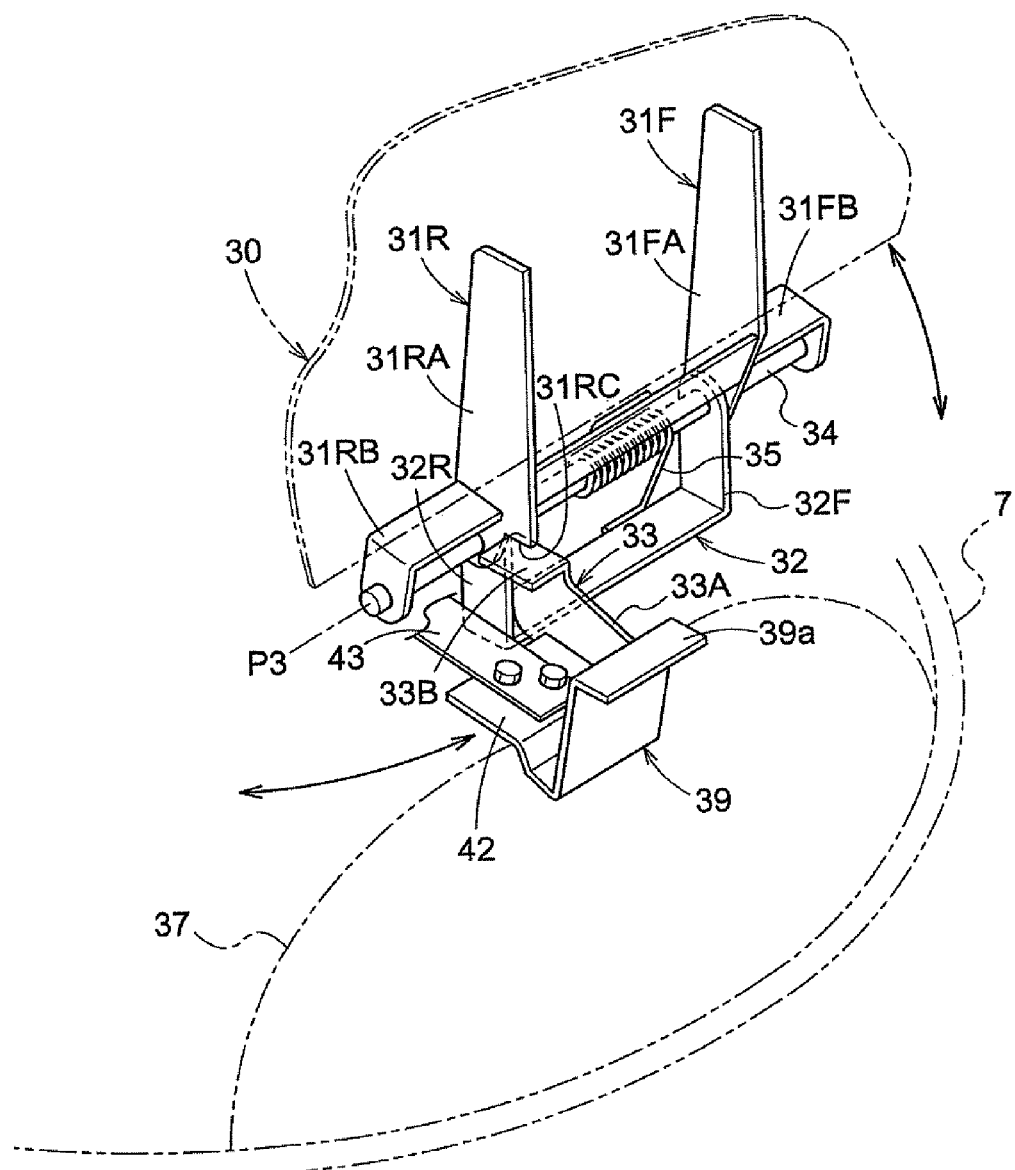
FIG. 10 is a perspective view for explaining an opening and closing construction of a pivotal cover.

As shown in FIG. 8 and FIG. 9, the pivotal cover 30 is switchable in its posture between a raised posture where the cover 30 is pivotally upward about the fore-and-aft axis P3 and a collapsed posture where the cover 30 is pivoted downward about the fore-and-aft axis P3 to be collapsed along the traveling surface. As illustrated in FIG. 4, in the raised posture, the right-side outer end of the pivotal cover 30 is positioned on the more inner side than the right-side outer end of the mower deck 7, so that the pivotal cover 30, in the raised posture, does not project to the outer side of the mower deck 7 in the plan view.

As shown in FIG. 4, FIG. 5 and FIGS. 8- 10, the pivotal cover 30 is formed by bending a flat plate into a downwardly open angular hook shape in the cross section along the fore and aft direction. So that, in the collapsed posture, the lower portion of the pivotal cover 30, and connecting portion 30a and a discharge portion 30b are open, respectively. The connecting portion 30a of the pivotal cover 30 for its connection with the mower deck 7 is formed linear in the collapsed posture in the plan view and its cross sectional shape is a downwardly open angular hook shape curved in conformity with the shape of the discharge outlet 7b of the mower deck 7. The discharge portion 30b of the pivotal cover 30 is shaped convex on the outer side in the collapsed posture in the plan view and its cross sectional shape is a downwardly open angular hook shape.

In its collapsed posture, the pivotal cover 30 exhibits a shape of a fan extending wider from the connecting portion 30a on the inner side thereof toward the discharge portion 30b on the outer side thereof, so as to allow discharge of cut grass in wide angle distribution. Further, in its rear view, the upper face of the pivotal cover 30 is inclined downward obliquely outward, so as to restrict "swirling-up" of cut grass being discharged from the pivotal cover 30.

On the upper face of the pivotal cover 30, there are fixedly attached front and rear arms 31F, 31R. The front arm 31F includes a band-plate like arm body 31FA and a reinforcing member 31FB extending forwardly from this arm body 31FA. The arm body 31FA and the reinforcing member 31FB define attaching holes formed coaxially and communicated with each other in the front and rear direction.

The rear arm 31R includes a band-plate like arm body 31RA and a reinforcing member 31RB extending rearwardly from this arm body 31RA. The arm body 31RA and the reinforcing member 31RB define attaching holes formed coaxially and communicated with each other in the front and rear direction. At the lower portion of the leading end of the arm body 31RA of the arm 31R, there is formed an engaging portion 31RC for engagement with a support member 33 cutout at its lower side as will be described later (see FIG. 8).

To an upper portion of the right side of the mower deck 7, there is affixed a bracket 32 having an upwardly open angular hook shape. And, in its front and rear boss portions 32F, 32R bent upward, there are formed through holes along the front and rear direction. And, into these front and rear through holes of the bracket 32 and the front and the attaching holes of the front and rear arms 31F, 31R, a pin 34 is inserted, so that the pivotal cover 30 is vertically pivotable about the axis P3 of the pin 34.

Between and across the front and rear arm bodies 31FA, 31RA, a fore-and-aft frame in the form of a band plate is affixed. And, between this fore-and-aft frame and the mower deck 7, there is provided a torsion spring 35. The pivotal cover 30 is pressed downward by an urging force of this torsion spring 35, so that vertical displacement of the pivotal cover 30 due to e.g. traveling of the riding lawn mower may be restricted.

With the above-described construction of the pivotal cover 30, when the pivotal cover 30 is pivoted downward, the dead weight of the pivotal cover 30 serves to retain this cover 30 in the lowered state, whereby the grass pieces discharged from the discharge outlet 7b of the mower deck 7 may be guided obliquely rearward to the right side of the riding lawn mower.

[Detailed Construction of Slide Cover]

Next, with reference to FIGS. 4-9, the construction of a slide cover 37 (corresponding to "an opening and closing member") will be described in details. As shown in FIG. 8 and FIG. 9, a pulley holder 38 is fixed by fastening to a blade attaching portion 7c provided on the upper face of the mower deck 7. And, to this pulley holder 38, the drive shaft 11 is rotatably attached via a pair of upper and lower bearings 39.

At the lower end of the drive shaft 11, there is fixed and fastened the rotary blade 9, and at the upper end of the drive shaft 11, the transmission pulley 18 is fixed as being fastened from the upper side thereof. In operation, as the transmission pulley 18 is rotated via the transmission belt 21, the rotary blade 9 is rotatably driven.

In the outer peripheral portion at the upper end of the pulley holder 38, there is integrally formed a concave groove 38a along the entire periphery thereof. A body portion of a pivotal arm 40 having a cylindrical body and a band-like arm member fixed thereto is fitted to the pulley holder 38 from above and a ring-like stopper member 41 is fitted into the groove 38a. With these, the pivotal arm 40 is attached to the pulley holder 38 to be pivotable relative thereto, with its vertical displacement being restricted, so that the pivotal arm 40 is pivoted in the front and rear direction about the axis P2 of the rotary blade 9.

Such components as the pulley holder 38, the drive shaft 11, etc. are covered by a curved conical guide plate 36. So that, in a mulching mode to be described later, cut grass blown up by the wind-raising blade 9b provided at the leading end of the rotary blade 9 may flow efficiently within the cutting chamber 25, thus preventing stagnation of the cut grass in the vicinity of the pulley holder 38, the drive shaft 11, etc., thus preventing interference with the flowing movement of the cut grass.

As shown in FIG. 4 and FIG. 5, the slide cover 37 is configured so as to be able to cover the discharge outlet 7b of the mower deck 7 from above over its entire surface and this shape of the cover is vertically curved so as to conform with the shape of the mower deck 7.

As shown in FIG. 5, FIG. 8 and FIG. 9, at the upper end of the slide cover 37, a bracket 42 is fixedly attached. And, between and across this bracket 42 and the pivotal arm 40 described above, there is provided a band-like plate spring 43. So that, via the pivotal arm 40 and the plate spring 43, the slide cover 37 is supported to be pivotable in the front and rear direction about the axis P2 of the rotary blade 9. In this way, the pivotal arm 40, the bracket 42, the plate spring 43, etc. together constitute "a moving mechanism" for slidably moving the slide cover 37 along the outer peripheral face of the mower deck 7 to a closing position and also to an opening position.

When the slide cover 37 is not opened and closed, the slide cover 37, with its dead weight, is placed in contact with the outer peripheral face of the mower deck 7, and then as the slide cover 37 is manually pushed up slightly, the plate spring 43 will be deformed to cause the slide cover 37 to leave the outer face of the mower deck 7, whereby the slide cover 37 can now be slid easy and smoothly.

The lower edge of the slide cover 37 is attached in such a manner as to extend along the above-described edge portion 7a of the mower deck 7. With this, when the slide cover 37 is closed, leak of air inside the mower deck 7 is effectively restricted and also the slide cover 37 can be slid easily and smoothly along the edge portion 37a of the mower deck 7.

At the upper portion of the slide cover 37 and on the lateral side of the bracket 42, a support member 33 is fixedly attached. This support member 33 consists of a vertical plate 33A fixed at its lower end to the slide cover 37 and a contact portion 33B formed as a bent portion from the upper end of the vertical plate 33A. When the slide cover 37 is closed, the contact portion 33B is disposed downwardly of the rear arm 31R affixed to the pivotal cover 30 in its raised posture.

At an end of the slide cover 37 on the outer side of the bracket 42, there is integrally formed an assist member 39 having an L-shaped vertical cross section, so that by pulling up a grip portion 39a of this assist member 39, the slide cover 37 can be moved, thus improving the operability of the slide cover 37.

Figure 6:
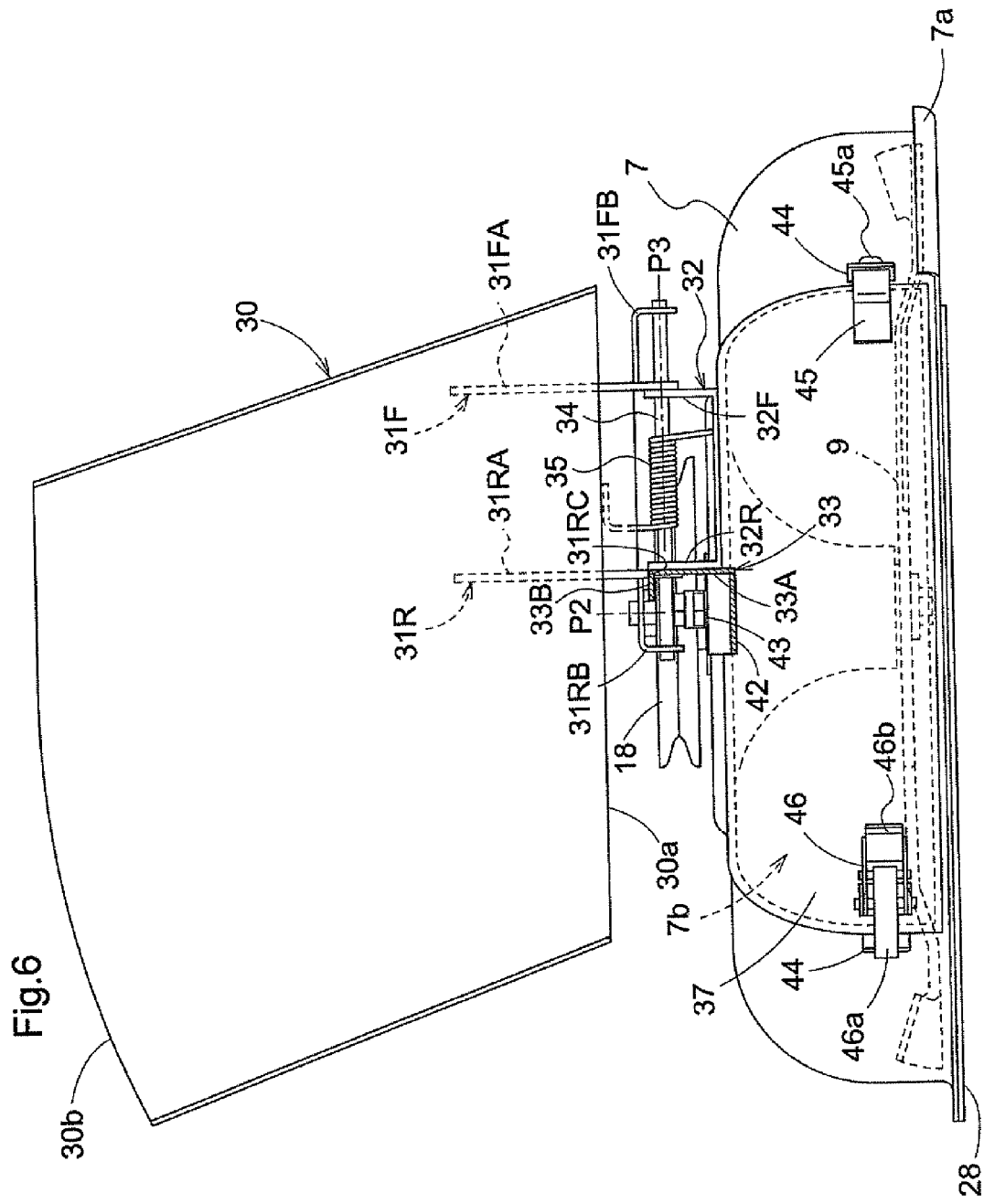
FIG. 6 is a right side view of the mower in the mulching mode.
Figure 7:
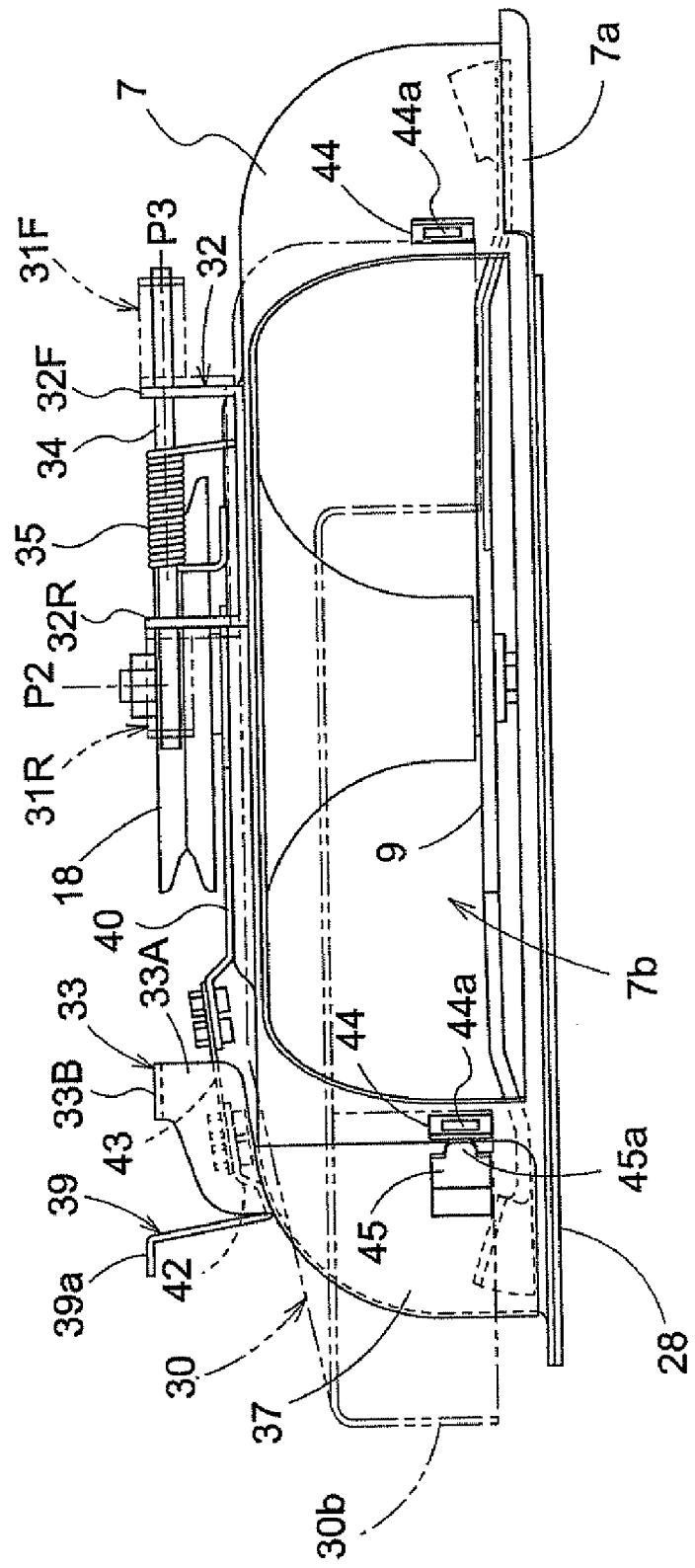
FIG. 7 is a right side view of the mower in the side-discharge mode.

As shown in FIGS. 6 and 7, at the portion of the mower deck 7 on the front and rear sides of the discharge outlet 7b, there are fixedly attached L-shaped hooks 44 each having an engaging hole 44a. At the front end of the slide over 37, there is fixedly attached a plate 45 having a projection 45a to be engaged with the engaging hole 44a of the hook 44. And, at the rear end of the slide cover 37, there is fixedly attached a fixing member 46 having a pawl portion 46a to be engaged with the L-shaped hook 44. In the opened condition of the slide cover 37 (the condition shown in FIG. 7), the slide cover 37 is closed to bring the projection 45a of the plate 45 into engagement with engaging hole 44a of the hook 44 so as to retain the front end of the slide cover 37. In this condition, the pawl portion 46a of the fixing member 46 will be engaged with the L-shaped hook 44 to push the control portion 46b of the fixing member 46 forwardly, whereby the slide cover 37 can be fixed in the closed condition (the condition shown in FIG. 6).

As shown in FIG. 5, at an outer peripheral portion of the mower deck 7 located at the left end of the slide cover 37 in its opened condition, there is also fixedly attached a hook 44 having the same shape as the above-described hooks 44 provided at the front and rear ends of the discharge outlet 7b. In operation, when the slide cover 37 is opened, the pawl portion 46a of the fixing member 46 located on the center rear side of the mower deck 7 will be engaged with the L-shaped hook 44 to push the control portion 46b of the fixing member 46 to the right side, whereby the slide cover 37 can be fixed in the opened condition.

With the above-described construction of the slide cover 37, from the condition where the discharge outlet 7b is opened by the slide cover 37, the fixing member 46 will be released and then the slide cover 37 will be pulled up slightly by the assist member 39 to be slid to the front side and the plate 45 will be engaged with the hook 44 and the fixing member 46 will be operated. With these, the discharge outlet 7b can be closed. Further, from the condition where the discharge outlet 7b is closed by the slide cover 37, the fixing member 46 will be released and the engagement between the plate 45 and the hook 44 will be released and the slide cover 37 will be pulled up slightly by the assist member 39 to be slid to the rear side and the fixing member 46 will be operated. With these, the discharge outlet 7b can be opened.

[Operation Modes of Riding Lawn Mower]

Next, with reference to FIGS. 4-10, two operation modes which can be realized by this riding lawn mower will be described. As shown in FIG. 4, FIG. 6, FIG. 8 and FIG. 10, when the pivotal cover 30 is pivoted upward to be switched over into the raised posture and the slide cover 37 is slid forwardly to close the discharge outlet 7b, the support member 33 fixed to the slide cover 37 is moved to the lower side of the arm 31R of the pivotal cover 30. Then, the side cover 37 is fixed to the mower deck 7, thus realizing the mulching operation mode for allowing cut grass to stay inside the mower deck 7 to be shredded into further smaller pieces. Whereas, when the operator moves his or her hand away from the pivotal cover 30, the engaging portion 31RC of the arm 31R will come into contact with the contact portion 33B of the support member 33, so that the pivotal cover 30 is maintained in its raised posture. In this case, as the urging force of the torsion spring 35 is effective for pressing the engaging portion 31RC against the contact portion 33, looseness in the pivotal cover 30 can be prevented, hence, the pivotal cover 30 can be maintained in a stable manner. In this way, the support member 33 fixed to the slide cover 37 and the engaging portion 31RC formed in the arm 31R together constitute a retaining mechanism for retaining the slide cover 37 in its raised posture.

As shown in FIG. 5, FIG. 7, FIG. 9 and FIG. 10, when the slide cover 37 is slid rearwards to open up the discharge outlet 7b, the support member 33 fixed to the slide cover 37 is moved rearward, thus allowing downward pivotal movement of the pivotal cover 30. And, the slide cover 37 will be fixed to the mower deck 7, thus realizing the side-discharge operation mode for discharging cut grass to be discharged from the inside of the mower deck 7 to the right rear side of the vehicle body. Then, when the operator moves his or her hand away from the pivotal cover 30, the pivotal cover 30 will be switched over into the collapsed posture.

With the above-described constructions of the pivotal cover 30 and the slide cover 37 which allow realization of the mulching operation mode and the side-discharge operation mode, the switchover operation between the two operation modes can be carried out easily and speedily. Moreover, the switchover operations between the mulching mode and the side-discharge mode can be effected, without needing to detach such components as the slide cover 37, the pivotal cover 30, etc. from the mower deck 7. Furthermore, as the pivotal cover 30 is retained in its raised posture, in the mulching mode, the pivotal cover 30 does not project to the right outer side of the mower deck 7. Hence, in the mulching operation mode, the total width of the mower unit M can be restricted, so that the mower deck 7 can be moved closer, on its right and left sides, to a wall, adjacent lawn lane (lance adjacent cut lawn lane) to effect a lawn mowing operation, without occurrence of cutting leftover (cutting failure).

[Detailed Construction of Link Mechanism]

Next, with reference to FIG. 1 and FIG. 11, the construction of the link mechanism 4 will be described in details. As shown in FIG. 1, the link mechanism 4 includes a lift link 50, a front 54, front and rear brackets 55, 56, a coupling member 61 and a coupling bolt 62.

The front end of the lift link 50 is connected via a support bracket 53, to a vehicle frame 63 to be pivotable about a right and left axis. The rear end of the lift link 50 is connected via the rear bracket 56 to the rear portion of the mower deck 7 to be pivotable about a right and left axis. At a front and rear center portion of the lift link 50, one end of the front link 54 is connected to be pivotable about an axis along the right and left direction and the other end of this front link 54 is connected to the front bracket 55 extending upward from the mower deck 7 to be pivotable about a right and left axis.

Downwardly of a driver's seat 57, there is supported a control arm 59 operably connected to a t lever 58 to be pivotable about a right and left axis. And, to the leading end of this control arm 59, there is fixed a coupling pin 60. The leading end of the control arm 59 is operably coupled to a rear portion of the lift link 50 via the coupling member 61 and the coupling bolt 62. In operation, when the control am 59 is pivoted with an operation of the lift lever 58, the rear portion of the lift link 50 is pivoted, so that the mower unit M can be lifted and lowered via the front and rear brackets 55, 56.

Figure 11:
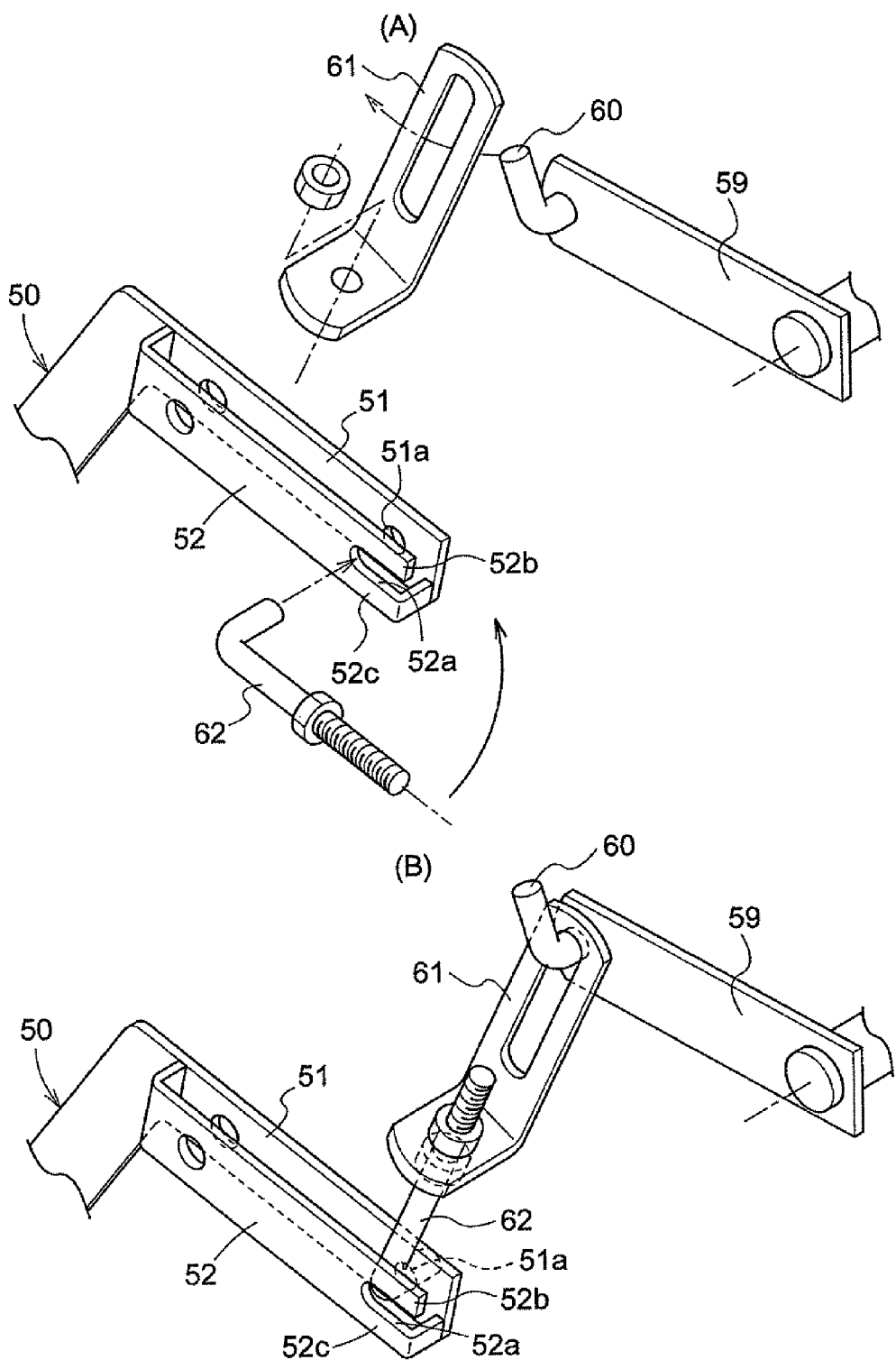
FIG. 11 is a perspective view for explaining a construction of a link mechanism.

As shown in FIG. 11, at the rear end of the link 50, there is fixedly attached a band-plate like first member 51 defining a laterally oriented coupling hole 51a at its leading end. And, on the outer side of this first member 51, and with a predetermined distance therefrom, a second member 52 is fixedly attached. At the rear end of this second member 52, there is formed a cutout portion 52a, and a leading end lower portion 52c located at the lower side of this cutout portion 52a is bent to the inner side to be fixedly attached to the first member 51.

With the above-described construction of the rear end portion of the lift link 50, from the fore-and-aft oriented condition of the coupling bolt 62 shown in FIG. 11 (A), the leading end of this coupling bolt 62 will be inserted into the coupling hole 51a of the first member 51 from the outer side thereof and then, as shown in FIG. 11 (B), the coupling bolt 62 will be pivoted upward so as to be coupled with the coupling member 61 operably coupled with the control arm 59, whereby the rear portion of the lift link 50 and the coupling member 61 can be operably coupled with each other via the coupling bolt 62. When the coupling bolt 62 shown in FIG. 11(B) is pivoted upward to be operably coupled with the control arm 59 via the coupling member 61, the leading end (lower end portion) of the coupling bolt 62 is bound between the leading end of the first member 51 and the leading end upper portion 52b of the second member 52, thus being restricted in its lateral displacement.

As a result, in comparison with e.g. a construction of coupling the rear portion of the lift link 50 with the coupling bolt 62 via a split pin (not shown), the coupling and uncoupling between the rear portion of the lift link 50 and the coupling bolt 62 can be effected easily and speedily without needing to use a tool such as a pair of nippers (not shown) for attaching or detaching the split pin. Hence, the assembly operation and maintenance operation of the link mechanism 4 (the maintenance operation of the mower unit M) can be improved.

[Opening and Closing Construction of Engine Hood]

Next, with reference to FIG. 1 and FIGS. 12-14, the opening and closing construction of the engine hood 65 will be described. As shown in FIG. 1, the hood 65 is attached to the leading end of the front frame 64 extending forwardly from the vehicle body frame 63 via a pair of brackets 66 to be pivotally opened and closed. When the engine hood 65 is pivoted forwardly, the space upwardly of the engine 5, etc. can be opened up to allow e.g. a maintenance operation of the engine 5.

Figure 12:
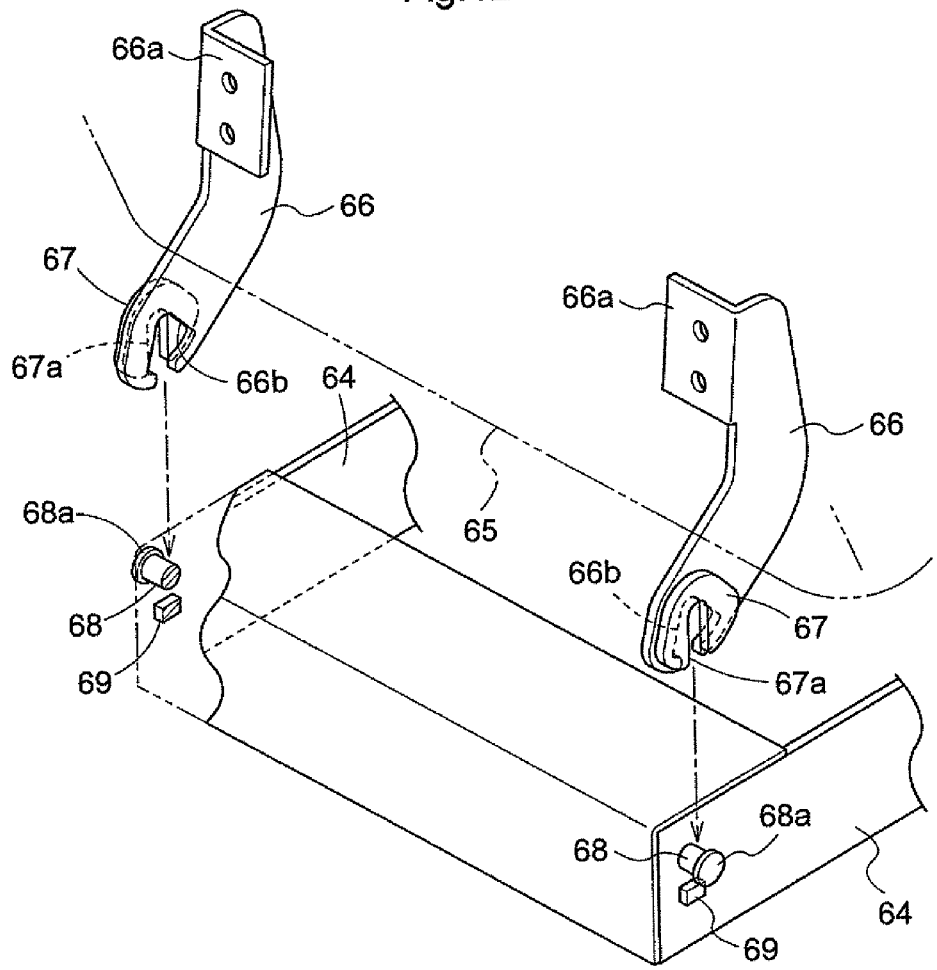
FIG. 12 is a perspective view for explaining an opening and closing construction of an engine hood.
Figure 13:
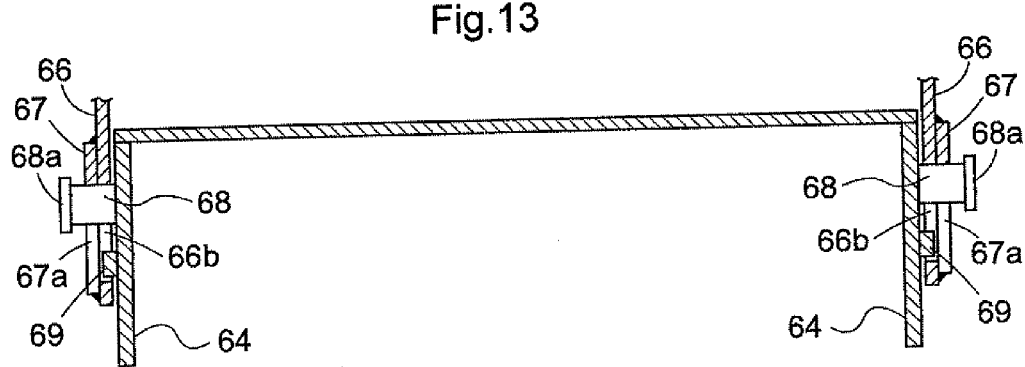
FIG. 13 is a front view in vertical section for explaining the opening and closing construction of the engine hood.

As shown in FIGS. 12-14, each of the right and left brackets 66 is formed of a plate member in the form of a vertical flat plate. And, at one end thereof, there is formed an attaching portion 66a as an inwardly bent portion. And, to this attaching portion 66a, the engine hood 65 formed of resin is fixed by fastening. At the other end of the bracket 66 away from the side of the attaching portion 66a, there is formed an opening 66b having a fan shape in its side view. And, a plate member 67 is fixedly attached so as to cover this opening 66b from the outer side, and a pin insertion hole 67a is formed in this plate member 67.

At the leading end of the front frame 64, a pin 68 projects therefrom to a lateral outer side, with the pin 68 forming a stopper flange portion 68a at its leading end. And, to the lower side of this pin 68, there is fixedly attached a fixing member 69.

As shown in FIG. 14(B), when the hood 65 is to be assembled with the front frame 64, the pin insertion hole 67a of the plate member 67 will be fixed in position relative to the pin 68 and the fixing member 69 juxtaposed vertically. Then, the bracket 66 will be fitted to the pin 68 and the fixing member 69, whereby the pin 68 and the fixing member 69 will be inserted into the pin insertion hole 67a of the plate member 67. And, then, the hood 65 will be inclined rearward, whereby the fixing member 69 will be engaged with the opening 66b of the bracket 66, so that the upward displacement of the bracket 66 is restricted by the pin 68 and the fixing member 69. On the other hand, when the hood 65 is to be detached from the front frame 64, the hood 65 will be pivoted rearward to fix the pin insertion hole 67a of the plate member 67 in position relative to the pin 68 and the fixing member 69 vertically juxtaposed. Then, the engagement between the fixing member 69 and the opening 66b of the bracket 66 will be released and then the hood 66 will be pulled up.

With use of the attaching and detaching construction of the engine hood 65, the maintenance operation of the engine 5 or the like can be carried out, with detachment of the hood 65. So, that the efficiency of the maintenance operation can be improved. Moreover, in comparison with a construction (not shown) involving use of a bolt, a nut, or the like in the attachment and detachment of the engine hood 65, the attachment and detachment of the hood 65 can be carried out easily and speedily, without use of any tool so that the efficiency of the maintenance operation can be further improved.

As shown in FIG. 14(A), the engine hood 65 can be detached only in an intermediate (medium) condition between the fully closed condition of the hood 65 being fully closed and the fully open condition of the hood 65 being fully opened. Therefore, in the case of e.g. a simple maintenance operation without needing detachment of the hood 65 or an operation for replenishing fuel to a fuel tank (not shown), such maintenance operation of the engine 5 or the like and fuel replenishing operation can be done, without needing to pivot the engine hood 65 to its fully open condition to detach this hood 65. Consequently, the attachment and detachment of the engine hood 65 can be done selectively, depending on the contents of the maintenance operation. Hence, the efficiency of the maintenance operation can be improved even further.

[Lock Constructions of Parking Brake Pedal and HST Pedal]

Next, with reference to FIGS. 1 and 15, there will be described locking constructions of a parking blade pedal 71 and an HST pedal 72. As shown in FIG. 1, adjacent a right foot of a driver as seated at the driver's seat 57, the parking pedal 71 and the HST pedal 72 are disposed. The parking brake pedal 71 is operably coupled with right and left rear wheel brakes (not shown) attached to the right and left rear wheels 2. When this parking brake pedal 71 is stepped on, the right and left rear wheel brakes are activated.

The HST pedal 72 is operably coupled with an first (hydrostatic stepless speed changing device) mounted in the transmission case 27. When the HST pedal 72 is stepped on, a change speed operation of the riding lawn mower is effected. Incidentally, when the parking brake pedal 71 is not stepped on, the rear wheel brakes are urged to their inoperative condition,. Whereas, when the HST pedal 72 is not stepped on, this pedal is urged to its neutral position.

Figure 15:
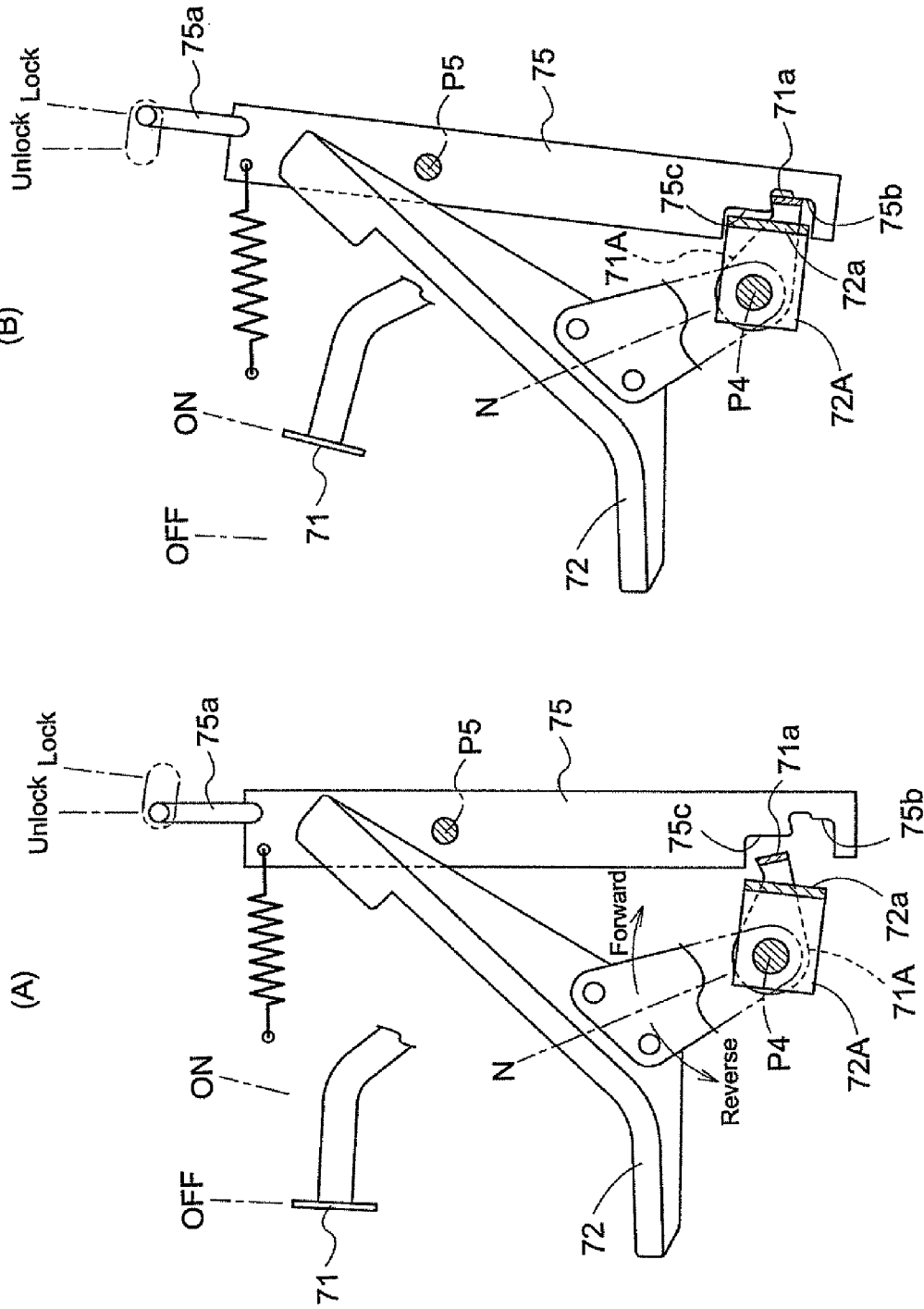
FIG. 15 is a schematic side view in vertical section for explaining a lock mechanism of an HST pedal.

As shown in FIG. 15, a bracket 71A operably coupled with the parking brake pedal 71 and a bracket 72A operably coupled with the HST pedal 72 are supported to be pivotable independently of each other about a right and left axis P4. Inside a lower cover 74 covering a lower portion of the steering wheel 73, a lock member 75 is supported to be pivotable about a right and left axis P5. And, a control portion 75a extends from an upper portion of this lock member 75 to the right side of the lower cover 74.

An engaging portion 71a extends from the bracket 71A operably coupled with the parking brake pedal 71. And, this engaging portion 71a of the parking brake pedal 71 is disposed at a position overlapped with the lock member 75 in the front view. An engaging portion 72a extends laterally from the bracket 72A operably coupled with the HST pedal 72. And, this engaging portion 72a of the HST pedal 72 is disposed at a position overlapped with the lock member 75 in the front view. At the lower end of the lock member 75, there are formed a first cutout portion 75*b* engageable with an engaging portion 71*a* of the parking brake pedal 71 and a second cutout portion 75*c* engageable with an engaging portion 72*a* of the HST pedal 72.

From the released condition shown in FIG. 15(A) where the lock member 75 is pivoted rearward, if the parking brake pedal 71 is stepped on and the lock member 75 is pivoted forwardly, as shown in FIG. 15(B), the first cutout portion 75*b* of the lock member 75 will engage the engaging portion 71*a* of the parking brake pedal 71, thus realizing a locked condition in which the activated condition of the rear wheel brakes with the stepping-on operation of the parking brake pedal 71 is maintained And, also, as the second cutout portion 75*c* of the lock member 75 engages the engaging portion 72*a* of the HST pedal 72, there is realized a locked condition which inhibits the HST pedal 72 from being activated with a stepping-on operation thereof On the other hand, from the locked condition shown in FIG. 15(B) in which the lock member 75 has been pivoted forwardly, if the parking brake pedal 71 is stepped on and the lock member 75 is pivoted rearward, as shown in FIG. 15 (A), the engagement between the first cutout portion 75*b* of the lock member 75 and the engaging portion 71*a* of the parking brake pedal 71 and the engagement between the second cutout portion 75*c* of the lock member 75 and the engaging portion 72*a* of the HST pedal 72 will be released, thus realizing a released condition in which stepping-on operations of the parking brake pedal 71 and the HST pedal 72 are allowed.

As described above, by locking the parking brake pedal 71 and the HST pedal 72 with the lock member 75, the braked condition of the rear wheels by the parking brake pedal can be maintained and at the same time, the operation of the HST pedal 72 can be inhibited, thus preventing erroneous operation of the HST pedal 72. As a result, while the parking brake pedal 71 is locked to activate the rear wheel brakes, if the HST pedal 72 is stepped on in this condition (by traveling the riding lawn mower in the activated condition of the rear wheel brakes), this would result in application of excessive force to the rear wheel brakes and the HST, thus resulting in damage to the rear wheel brakes and HST. Such trouble as this can be effectively avoided by the above-described construction, Further, the above-described construction which allows locking of the parking brake pedal 71 and the HST pedal 72 with the single lock member 75, in comparison with a construction which provides separate lock members (not shown), it is possible to avoid accidental locking failure of the lock member 75 and also to improve the controllability of the lock member 75.

First Alternative Embodiment of the Invention

In the foregoing embodiment, as the opening and closing member, the slide cover 37 is slid along the mower deck 7. However, the opening and closing member can have a different construction as long as it can open and close the discharge outlet 7*a* of the mower deck 7. For instance, a detachable type opening and closing member (not shown) can be used for closing and opening the discharge outlet 7*a* of the mower deck 7.

In the foregoing embodiment, as the guide member, the pivotal cover 30 is pivotally supported to the mower deck 7, so as to be switched over between the raised posture and the collapsed posture. However, as long as it can be switched over in its posture between the raised posture and the collapsed posture, the guide member can have a different construction. For instance, the guide member can be configured to be switched over in its posture, in association with attachment and detachment thereof to and from the mower deck 7.

In the foregoing embodiment, the retaining mechanism is constructed such that the pivotal cover 30 can be retained in its raised posture by means of the contact portion 31RC of the arm 31R and the support member 33. The retaining mechanism for retaining the pivotal cover 30 in its raised posture can have a different construction. For instance, the upper portion of the mower deck 7 or the pivotal cover 30 can include a retaining member (not shown) such as a chain, a stay, etc. so that the pivotal cover 30 may be retained in its raised posture, by coupling the pivotal cover 30 in the raised posture with the mower deck 7 by means of this retaining member.

Second Alternative Embodiment of the Invention

In the foregoing embodiment, to the right side of the mower deck 7, the slide cover 37 and the pivotal cover 30 are attached, and the cut grass are discharged to the right outer side in the side-discharge operation mode. Instead, the slide cover 37 and the pivotal cover 30 can be attached, to the left side of the mower deck 7 so that the cut grass are discharged to the left outer side in the side-discharge operation mode.

Third Alternative Embodiment of the Invention

In the foregoing embodiment, the riding lawn mower employs the twin blade construction in which the two rotary blades 8, 9 are mounted in the mower unit M. However, the present invention can be applied to a riding lawn mower which employs a triple blade construction in which three rotary blades (not shown) are mounted in the mower unit M.

In the foregoing embodiment, the riding lawn mower is the type in which the mower unit M is connected to the lower bottom of the mower between the front wheels 1 and the rear wheels 2 (so-called "zero turn" type mower). However, the invention can be applied to a different type of lawn mower in which the mower unit M is connected to a position forwardly of the front wheels 1 (so-called "front mower"). Further, the invention is not limited even to such riding lawn mowers, but can be applied to the mower unit of a walk-behind type lawn mower as well.

Fourth Alternative Embodiment of the Invention

Figure 16:
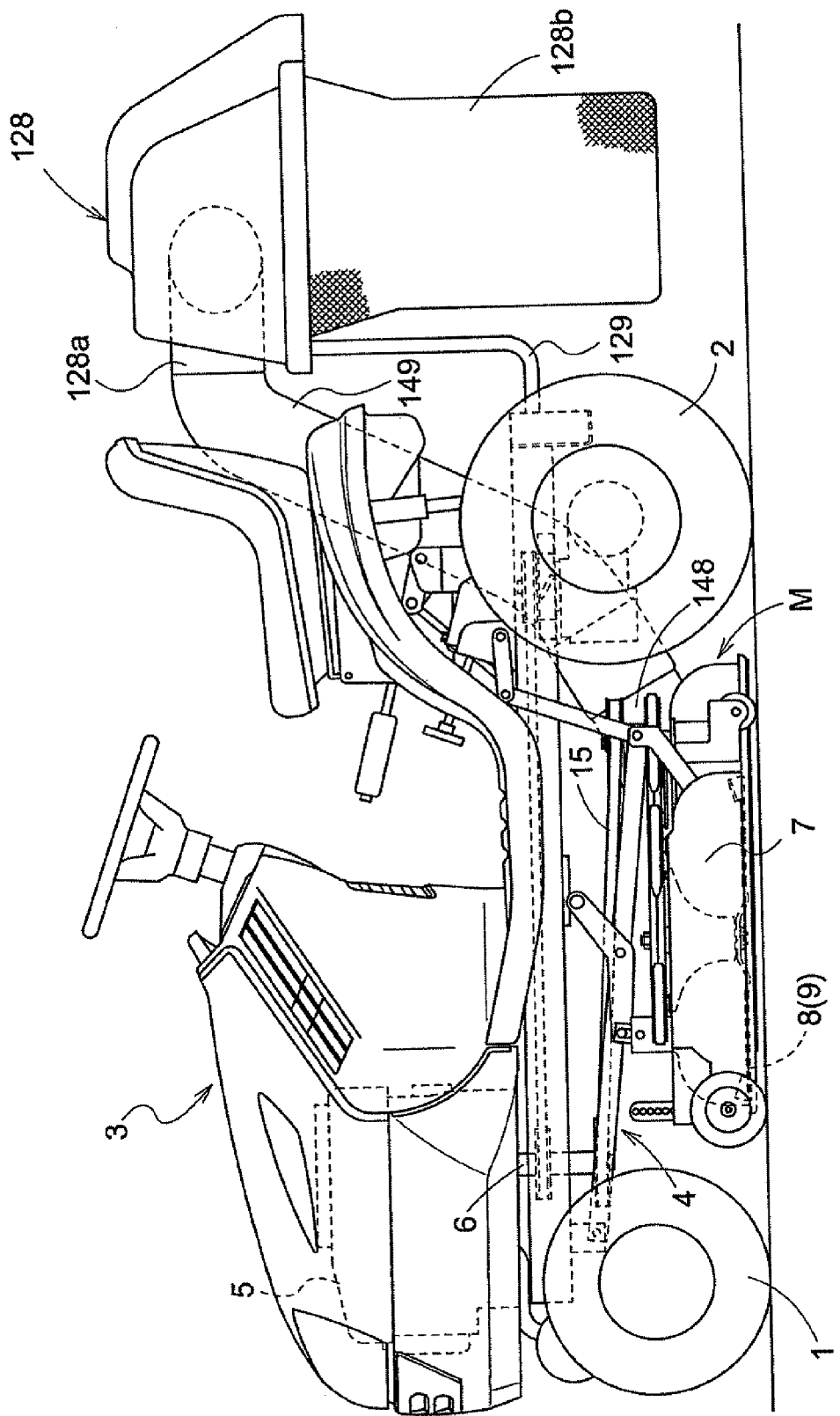
FIG. 16 is an overall left side view of the riding lawn mower with a grass collector attached thereto.

In this alternative embodiment, as shown in FIG. 16, the riding lawn mower has a grass collector 128 detachably attached to the rear portion of the mower. Hence, in a grass collecting operation mode to be described later, cut grass cut by the rotary blades 8, 9 can be transported via a grass collecting duct 148 and a bellows duct 149 to the grass collector 128 mounted at the rear portion of the vehicle body to be stored and collected therein.

From a rear portion of the riding lawn mower, a detachable attaching frame 129 extends rearwards. And, to this attaching frame 129 and from its rear side, the grass collector 128 is detachably attached. The grass collector 128 includes, at an upper portion thereof, a connecting port 128*a* to be connected with the bellows duct 149, and downwardly of this port, a collecting portion 128*b* for collecting grass is detachably provided. Then, by detaching the collecting portion 128*b* from the grass collector 128, cut grass collected in the collecting section 128*b* can be taken out of the vehicle.

Further, when the grass collecting duct 148 is connected to the mower M, the bellows duct 149 extendable and contractible between the rear end portion of the grass collecting duct 148 and the connecting port 128*a* provided at the upper portion of the grass collector 128 may be attached, whereby the cut grass cut by the mower M can be transported to the grass collector 128.

Figure 17:
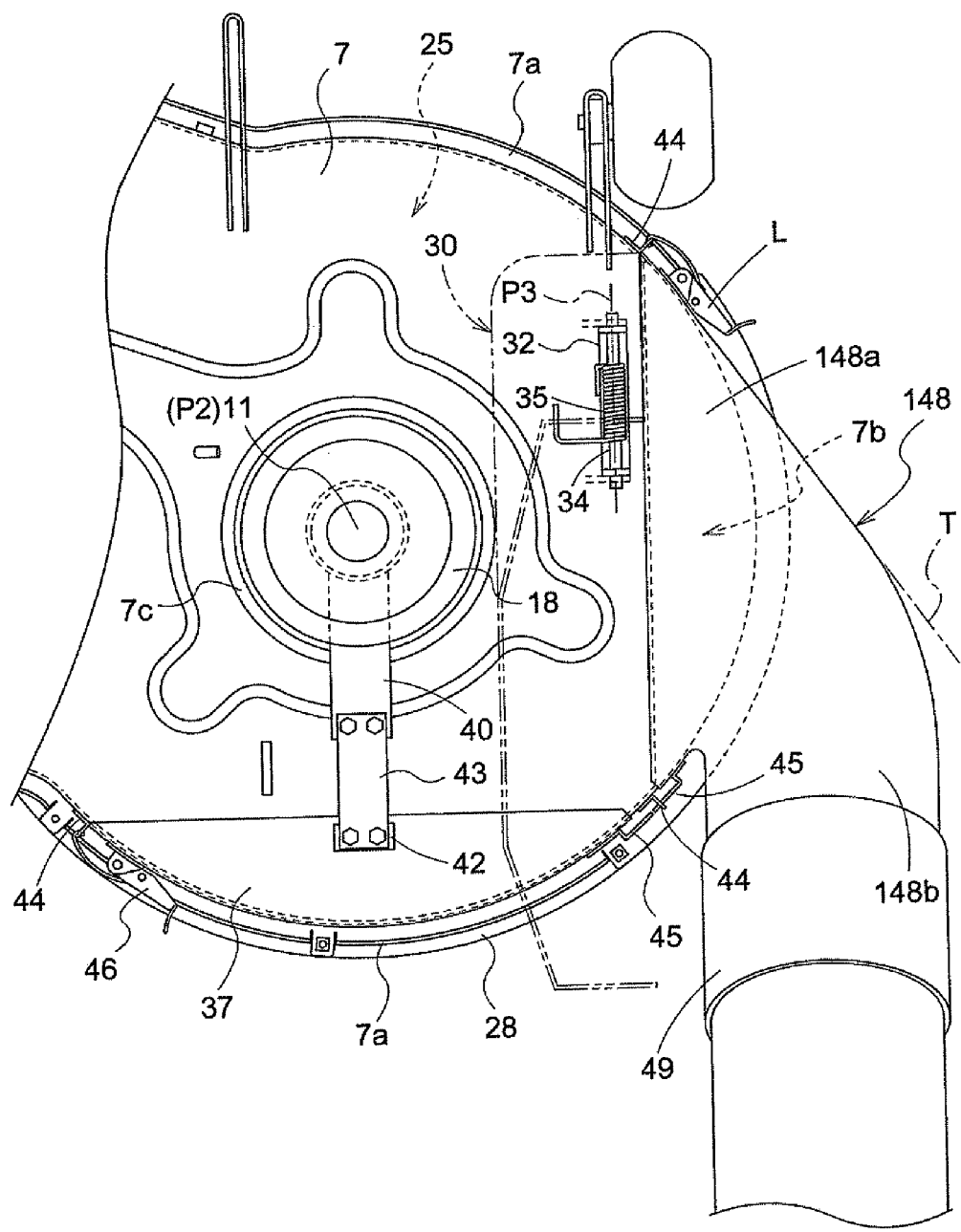
FIG. 17 is a plan view of the right portion of the mower in a cut grass collecting mode.

As shown in FIGS. 17 and 18, the grass collecting duct 148 comprises an integral assembly of a connecting portion 148a to be connected with the mower deck 7 located at the front portion and a pipe portion 148b extending obliquely upward and rearward from this connecting portion 148a.

The connecting portion 148a of the grass collecting duct 148 is configured so as to cover the discharge outlet 7b of the mower deck 7 in accordance with the shape of the mower deck 7. In its plan view, the connecting portion 148a is shaped to be curved smoothly along the oblique rearward direction along a tangent L to the outer peripheral face of the mower deck 7 at the position where the front hook 44 is provided., whereby the cut grass cut by the rotary blades 8, 9 can be smoothly guided to the grass collector disposed rearwards.

The pipe portion 148b of the grass collector 148 has a cylindrical shape and is formed integral with the above-described connecting portion 148a. And, this pipe portion 148b is shaped so as to extend from the rear end of the connecting port 128a with an obliquely rearward and upward curve, toward the connecting port 128a of the grass collector 128. Referring to the shape of the rear end portion of the pipe portion 148b, this portion has an outer diameter set so as to allow gapless engagement thereon of the bellows duct 149. These arrangements can effectively prevent of leak of air from the connection portion between the pipe portion 148b and the bellows duct 149, which leak, if occurred, would result in disadvantageous reduction in the ability of transporting the cut grass.

At the front end portion and the rear end portion of the connecting portion 148a of the grass collecting duct 148, there are fixedly attached a latch L and a plate 45 which are identical to a latch L and a plate 45 attached to the slide cover 37, respectively. In operation, by engaging a projection 45a of the plate 45 into an engaging hole 44a of the hook 44 rearwardly of the discharge outlet 7b and then operating the latch L, the grass collecting duct 148 can be secured to the mower deck 7. With this construction in which the grass collecting duct 148 is detachably attached to the mower deck 7 via the plate 45 and the latch L, in comparison with e.g. a construction in which the grass collecting duct 148 is fixed to the mower deck 7 with bolts (not shown) or the like, the attachment and detachment of the grass collecting duct 148 can be effected easily and speedily without needing to use any tool (not shown) for attaching or detaching the grass collecting duct 148. Hence, the efficiency of the attachment and detachment operations of the grass collecting duct 148 can be improved.

Further, as the same latch L and the plate 45 as those used for fixing the slide cover 37 are employed as the latch L and the plate 45 for fixing the grass collecting duct 148 to the mower deck 7, the hooks 44 fixed to the mower deck 7 can be used also as fitting tools for attaching the grass collecting duct 148 to the mower deck 7. Accordingly, in comparison with a case of providing separate tools for attaching the grass collecting duct 148 to the mower deck 7, the number of the components can be reduced and the manufacture costs can be reduced also.

With the grass collecting duct 148 having the above-described construction in operation, the slide cover 37 is opened to expose the discharge outlet 7b of the mower deck 7 and the pivotal cover 30 is pivoted upward. Then, in this condition, the projection 45a of the plate 45 on the rear end side of the grass collecting duct 148 is engaged into the engaging hole 44a of the hook 44 rearwardly of the discharge outlet 7b, thereby to retain the rear end portion of the grass collecting duct 148. Then, in this condition, when a pawl portion La of the latch L at the front end of the grass collecting duct 148 is engaged with the hook 4 forwardly of the discharge outlet 7b and then a control portion Lb of the latch L is collapsed rearward. With this, the grass collecting duct 148 can be fixed to the mower deck 7.

On the rear end portion of the pipe portion 148a constituting the grass collecting duct 148 fixed to the mower deck 7, the front end portion of the bellows duct 149 is engaged and then fasted thereto with a band (not shown) and the rear end portion of the bellows duct 149 is fixed and fastened with a band (not shown) to the connecting port 128a of the grass collector 128. With these, the discharge outlet 7b of the mower deck 7 and the connecting port 128a of the grass collector 128 can be connected to each other, thus realizing the grass collecting operation mode.

As shown in FIGS. 17 and FIG. 18, the pivotal cover 30 is pivoted upward and the slide cover 37 is slid rearward to expose the outlet discharge 7b and then the grass collecting duct 148 is fixed to the discharge outlet 7b. Further, the bellows duct 149 is attached between and across the grass collecting duct 148 and the grass collector 128, thus realizing the grass collecting operation mode. In this grass collecting operation mode, the cut grass cut by the rotary blades 8, 9 can be transported to the grass collector 128 to be collected eventually in the collecting portion 128b provided at the lower portion of the grass collector 128.

What is claimed is:

1. A mower unit comprising:

a mower deck;

a plurality of blades mounted inside said mower deck and rotatable about vertical shafts supported to said mower deck, said mower deck defining, on one lateral side thereof, a discharge outlet for discharging cut grass cut by the plurality of blades;

an opening and closing member configured to be moved to a closing position for closing said discharge outlet and also to an opening position away from said discharge outlet for opening the discharge outlet, said opening and closing member in said opening position extends along an outer face of said mower deck;

a guide member for guiding cut grass from said discharge outlet to a lateral outer side, said guide member being switchable in its posture between a raised posture and a substantially horizontal posture;

a retaining mechanism for retaining said guide member in the raised posture thereof, said retaining mechanism comprising a support member which is supported on said opening and closing member so as to support said guide member in said raised posture when said discharge outlet is closed; and wherein the mower deck has a cutting chamber for each of the plurality of blades, each cutting chamber having an inner surface with a cross-section taken at a vertical plane that passes through a respective one of the vertical shafts of the blades, the cross-section of the inner surface of each cutting chamber being curved closer toward the respective vertical shaft in an upward direction, and wherein an inner surface of the opening and closing member has a shape that corresponds to the inner surface of a corresponding cutting chamber.

2. The mower unit according to claim 1, further comprising a moving mechanism configured to allow said opening/closing member to be moved to said closing position and to said opening position.

3. The mower unit according to claim 2, wherein a portion of an outer peripheral face of the mower deck that overlaps with said opening and closing member has an arcuate shape as viewed from above;
  said opening and closing member has an arcuate shape corresponding to said overlapping portion of the mower deck; and
  said moving mechanism is configured to move said opening and closing member along the outer peripheral face of the mower deck.

4. The mower unit according to claim 1, wherein said retaining mechanism is configured to retain said guide member in said raised posture when said opening and closing member closes said discharge outlet, and to allow said guide member to be switched to said substantially horizontal posture when said opening and closing member opens said discharge outlet.

5. The mower unit according to claim 1, wherein said opening and closing member is configured to be pivotable about a vertical shaft supported to said mower deck.

6. The mower unit according to claim 1, further comprising:
  an arm configured to be pivotable about a vertical shaft supported to said mower deck, the arm disposed outside of the mower deck, and wherein said opening and closing member is fixed to one end of said arm to be pivotable between the closing position and the opening position.

7. A mower unit comprising:
  a mower deck;
  plurality of blades, each mounted inside said mower deck and rotatable about a respective vertical shaft supported to said mower deck, said mower deck defining, on one lateral side thereof, a discharge opening for discharging cut grass cut by the blades;
  an opening and closing member configured to be moved to a closing position to close said discharge opening and to an opening position away from said discharge opening to open said discharge opening, said opening and closing member in said opening position extends along an outer face of said mower deck;
  an arm configured to be pivotable about a vertical shaft supported to said mower deck, the arm disposed outside of the mower deck, and wherein said opening and closing member is fixed to one end of said arm to be pivotable between the closing position and the opening position;
  a guide member for guiding cut grass from said discharge opening to a lateral outer side, said guide member being switchable in its posture between a raised posture and a substantially horizontal posture; and
  a retaining mechanism for retaining said guide member in the raised posture thereof, said retaining mechanism comprising a support member which is supported on said opening and closing member so as to support said guide member in said raised posture when said discharge opening is closed.

8. The mower unit according to claim 7, wherein the arm is further configured to allow said opening and closing member to be moved to said closing position and to said opening position.

9. The mower unit according to claim 8, wherein a portion of an peripheral face of the mower deck that overlaps with said opening and closing member has an arcuate shape as viewed from above;
  said opening and closing member has an arcute shape corresponding to said overlapping portion of the mower deck; and
  said moving mechanism is configured to move said opening and closing member along the outer peripheral face of the mower deck.

10. The mower unit according to claim 7, wherein said retaining mechanism is configured to retain said guide member in said raised posture when said opening and closing member closes said discharge opening, and to allow said guide member to be switched to said substantially horizontal posture when said opening and closing member opens said discharge opening.

11. The mower unit according to claim 7, wherein said opening and closing member is configured to be pivotable about a vertical shaft supported to said mower deck.

12. The mower unit according to claim 7, wherein the mower deck has a cutting chamber for each of the plurality of blades, each cutting chamber having an inner surface with a cross-section taken at a vertical plane that passes through a respective one of the vertical shafts of the blades, the cross-section of the inner surface of each cutting chamber being curved closer toward the respective vertical shaft in an upward direction, and wherein an inner surface of the opening and closing member has a shape that corresponds to the inner surface of a corresponding cutting chamber.

* * * * *

UNITED STATES PATENT AND TRADEMARK OFFICE
CERTIFICATE OF CORRECTION

PATENT NO. : 7,610,742 B2  Page 1 of 1
APPLICATION NO. : 11/848753
DATED : November 3, 2009
INVENTOR(S) : Imanishi et al.

It is certified that error appears in the above-identified patent and that said Letters Patent is hereby corrected as shown below:

Column 2, Line 45, "opening closing" should read -- opening and closing --

Column 6, Line 44, "opened and closed" should read -- opened or closed --

Column 15, Line 31, Claim 7, "plurality of blades" should read -- a plurality of blades --

Column 16, Line 16, Claim 9, "an peripheral" should read -- an outer peripheral --

Column 16, Line 19, Claim 9, "an arcute shape" should read -- an arcuate shape --

Signed and Sealed this

Twenty-eighth Day of September, 2010

David J. Kappos
*Director of the United States Patent and Trademark Office*